(12) United States Patent
Morimoto et al.

(10) Patent No.: US 9,643,601 B2
(45) Date of Patent: May 9, 2017

(54) DRIVING ASSISTANCE DEVICE

(71) Applicant: NISSAN MOTOR CO., LTD., Yokohama-shi, Kanagawa (JP)

(72) Inventors: Akira Morimoto, Sagamihara (JP); Osamu Fukata, Sagamihara (JP); Yasuhisa Hayakawa, Yokohama (JP); Daisuke Oiki, Zama (JP); Daisuke Tanaka, Hadano (JP)

(73) Assignee: Nissan Motor Co., Ltd., Yokohama-shi, Kanagawa (JP)

( * ) Notice: Subject to any disclaimer, the term of this patent is extended or adjusted under 35 U.S.C. 154(b) by 0 days.

(21) Appl. No.: 14/439,551

(22) PCT Filed: Nov. 22, 2013

(86) PCT No.: PCT/JP2013/006879
§ 371 (c)(1),
(2) Date: Apr. 29, 2015

(87) PCT Pub. No.: WO2014/083821
PCT Pub. Date: Jun. 5, 2014

(65) Prior Publication Data
US 2015/0258988 A1    Sep. 17, 2015

(30) Foreign Application Priority Data

Nov. 27, 2012  (JP) ................................. 2012-259199

(51) Int. Cl.
*B60R 21/00* (2006.01)
*B60W 30/06* (2006.01)
*B60W 40/06* (2012.01)
*G08G 1/16* (2006.01)
(Continued)

(52) U.S. Cl.
CPC ............ *B60W 30/06* (2013.01); *B60K 28/10* (2013.01); *B60W 40/06* (2013.01);
(Continued)

(58) Field of Classification Search
CPC ... B60W 30/06; B60K 28/10; G06K 9/00798; G06K 9/00812
(Continued)

(56) References Cited

U.S. PATENT DOCUMENTS 7,940,193 B2 * 5/2011 Yamanaka ......... B62D 15/0275
340/436
2005/0137766 A1  6/2005 Miyakoshi et al.
(Continued)

FOREIGN PATENT DOCUMENTS

JP   2003137001 A   5/2003
JP   2005178626 A   7/2005
(Continued)

*Primary Examiner* — Mussa A Shaawat
*Assistant Examiner* — Nadeem Odeh
(74) *Attorney, Agent, or Firm* — Young Basile Hanlon & MacFarlane, P.C.

(57) ABSTRACT

A driving assistance device improves the accuracy of driving assistance for parking. A traveling controller detects a line positioned on a road surface from a captured image captured by a camera. A parking frame is extracted from the detected line and acceleration suppression control of a vehicle is executed based on the extracted parking frame. At this time, the acceleration suppression control is cancelled if a crossing is detected based on the captured image.

5 Claims, 27 Drawing Sheets

(51) Int. Cl.
  *B62D 15/02* (2006.01)
  *B60K 28/10* (2006.01)
  *G06K 9/00* (2006.01)
  *G08G 1/14* (2006.01)

(52) U.S. Cl.
  CPC ....... *B62D 15/027* (2013.01); *G06K 9/00798* (2013.01); *G08G 1/14* (2013.01); *G08G 1/16* (2013.01); *G08G 1/167* (2013.01)

(58) Field of Classification Search
  USPC .......................................................... 701/70
  See application file for complete search history.

(56) References Cited

U.S. PATENT DOCUMENTS

| | | | |
|---|---|---|---|
| 2008/0221767 A1 | 9/2008 | Ikeda et al. | |
| 2009/0088978 A1* | 4/2009 | Ishikawa | G01C 21/26 701/514 |
| 2010/0238051 A1 | 9/2010 | Suzuki et al. | |
| 2012/0143456 A1* | 6/2012 | Ueda | B60W 10/08 701/93 |

FOREIGN PATENT DOCUMENTS

| | | |
|---|---|---|
| JP | 2005316889 A | 11/2005 |
| JP | 2006331058 A | 12/2006 |
| JP | 2007137085 A | 6/2007 |
| JP | 2008087618 A | 4/2008 |
| JP | 2009101984 A | 5/2009 |
| WO | 2007026242 A1 | 3/2007 |

\* cited by examiner

VEHICLE TRAVEL DIRECTION

FIG. 24

| FLVL / ALVL | LEVEL 0 | LEVEL 1 | LEVEL 2 | LEVEL 3 | LEVEL 4 |
|---|---|---|---|---|---|
| 0 | — | — | — | — | — |
| LOW | — | EXTREMELY LOW | LOW | LOW | LOW |
| HIGH | — | EXTREMELY LOW | LOW | HIGH | EXTREMELY HIGH |

FIG. 25

| | TOTAL CERTAINTY FACTOR (TLVL) | EXTREMELY LOW | LOW | HIGH | EXTREMELY HIGH |
|---|---|---|---|---|---|
| ACCELERATION SUPPRESSION EXECUTION CONDITION (TIMING) | ACCELERATOR OPENING | 80% | 80% | 50% | 50% |
| CONTROL CONTENT | SUPPRESSION AMOUNT | SMALL | MIDDLE | MIDDLE | LARGE |
| | SOUND (NOTIFICATION) | ABSENT | PRESENT | PRESENT | PRESENT |

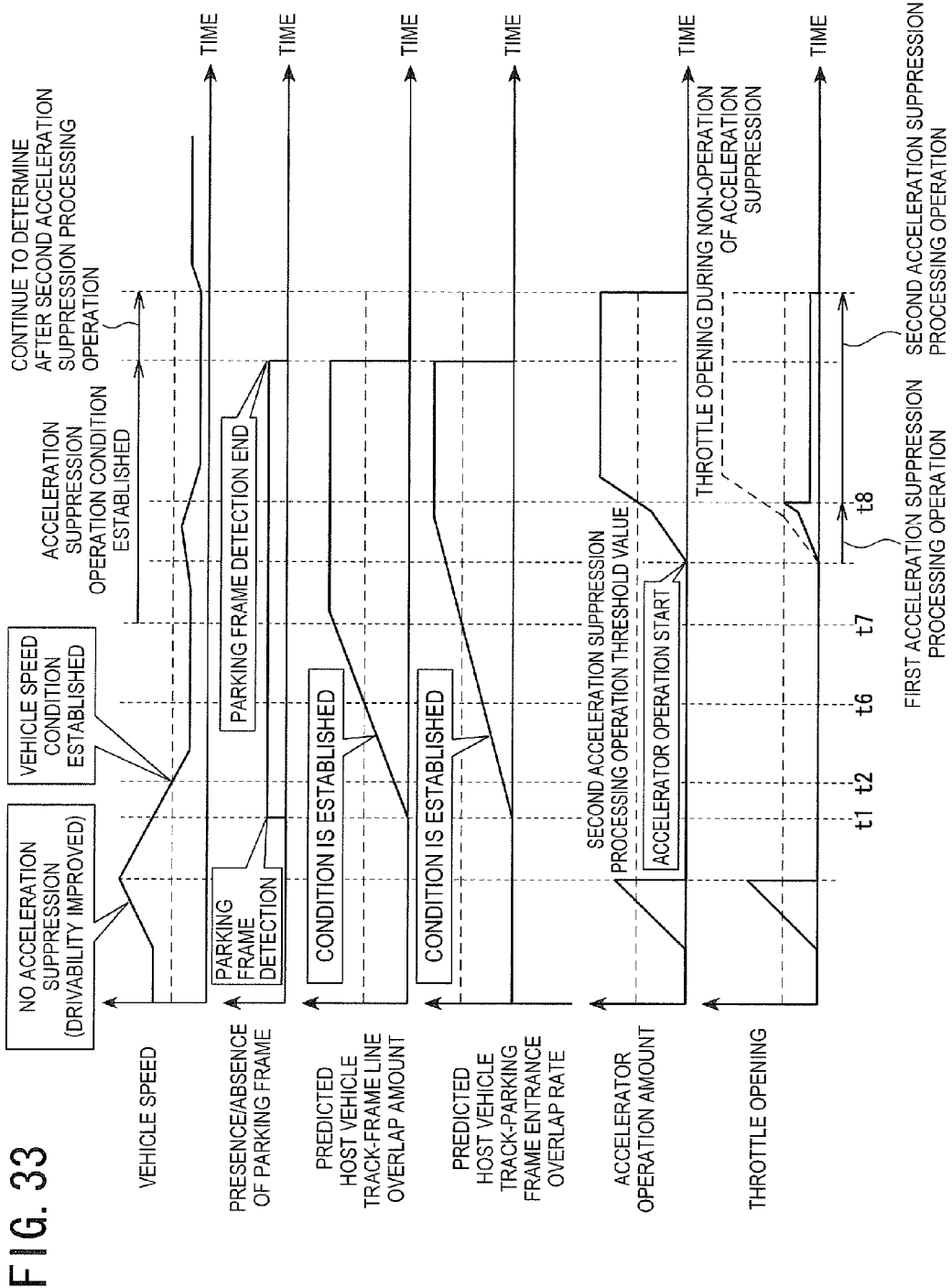

DRIVING ASSISTANCE DEVICE

CROSS REFERENCE TO RELATED APPLICATION

The present application claims priority to Japanese Patent Application No. 2012-259199, filed Nov. 27, 2012, incorporated herein in its entirety.

TECHNICAL FIELD

The present invention relates to a technology for driving assistance which assists vehicle driving for parking.

BACKGROUND

As a driving assistance device which controls a speed of a vehicle, for example, a safety device described in JP 2003-137001 A is known. In this safety device, it is detected that the vehicle is at a position out of a road from map data of a navigation device and information regarding a current position. Then, in the safety device, when it is determined that there is an accelerator operation in a direction of increasing the traveling speed of the vehicle and the traveling speed of the vehicle is greater than a predetermined value, a throttle is controlled in a deceleration direction regardless of an actual operation of the accelerator.

In JP 2003-137001 A, an accelerator pedaling operation when the host vehicle is at a position out of a road and the traveling speed equal to or greater than a predetermined value is detected based on map information is considered as a possible erroneous accelerator operation. For this reason, the above-described conditions are set as throttle suppression operation conditions. However, under the above-described operation condition, only if the vehicle is out of the road and approaches a parking lot, throttle suppression is operated depending on the vehicle speed, and drivability in the parking lot is deteriorated.

SUMMARY

The invention has been accomplished focusing on the above-described point, and an object of the invention is to improve the accuracy of driving assistance for parking.

In order to solve the above-described problem, a driving assistance device according to an aspect of the invention detects a line positioned on a road surface from a captured image captured by an imaging unit, extracts a parking frame based on the detected line, and executes acceleration suppression control for reducing acceleration generated in a vehicle according to an operation amount of an acceleration operator based on the extracted parking frame. If a crossing is detected based on the captured image, the acceleration suppression control is cancelled.

According to the aspect of the invention, even when the acceleration suppression control is operating with the detection of a parking frame at or near a crossing position, if a crossing is detected, the acceleration suppression is cancelled. As a result, it is possible to avoid acceleration suppression of a vehicle when passing through a crossing, and to improve the accuracy of driving assistance for parking.

BRIEF DESCRIPTION OF THE DRAWINGS

FIG. 24 is a diagram for describing a method of calculating a total certainty factor TLVL.

FIG. 25 is a diagram for describing parking assistance control using the total certainty factor TLVL of FIG. 24.

FIG. 33 is a diagram illustrating a time chart example in the second embodiment.

DETAILED DESCRIPTION OF THE EMBODIMENTS

Figure 1:
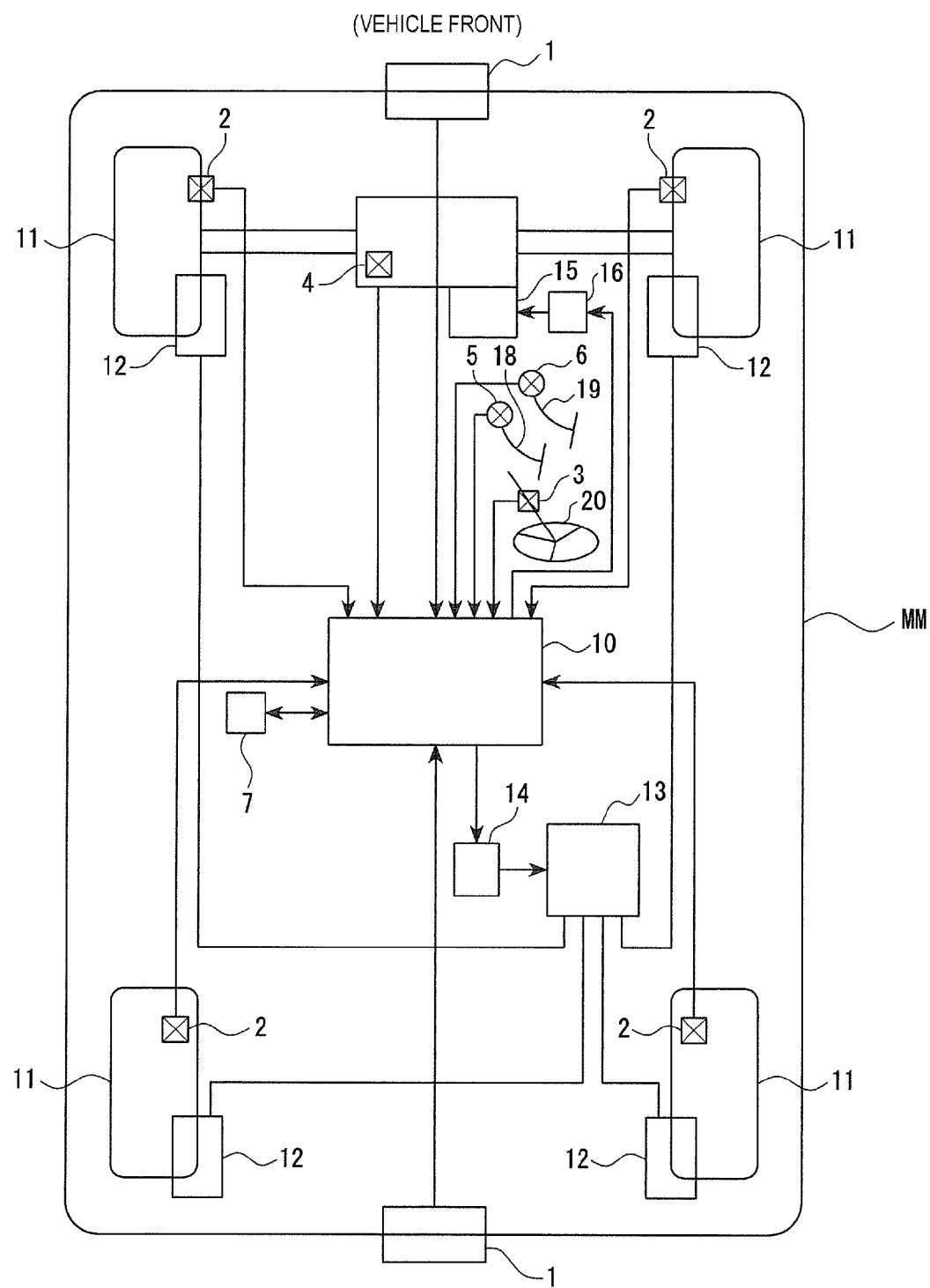
FIG. 1 is a conceptual diagram illustrating the configuration of a vehicle according to an embodiment of the invention.

Hereinafter, an embodiment of the invention will be described in detail referring to the drawings.

First Embodiment (Configuration)

A vehicle includes a braking device which generates a braking force, and a driving device which generates a driving force.

As illustrated in FIG. 1, the braking device includes brake devices 12 which are provided in wheels 11, a fluid pressure circuit 13 which includes pipes connected to the respective brake devices 12, and a brake controller 14. The brake controller 14 controls the braking force generated in each brake device 12 through the fluid pressure circuit 13 to a value depending on a braking force command value. The brake devices 12 are not limited to a device which applies a braking force with a fluid pressure, and may be an electric brake device or the like.

As illustrated in FIG. 1, the driving device includes an engine 15 which serves as a driving source, and an engine controller 16 which controls torque (driving force) generated in the engine 15. The driving source of the driving device is not limited to the engine 15, and may be an electric motor or may have a hybrid configuration in which the engine 15 and the motor are combined.

The brake controller 14 and the engine controller 16 are respectively configured to receive command values of a braking command and a driving command (acceleration command value) from a traveling controller 10 as a host controller. The brake controller 14 and the engine controller 16 form an acceleration/deceleration control device.

Figure 2:
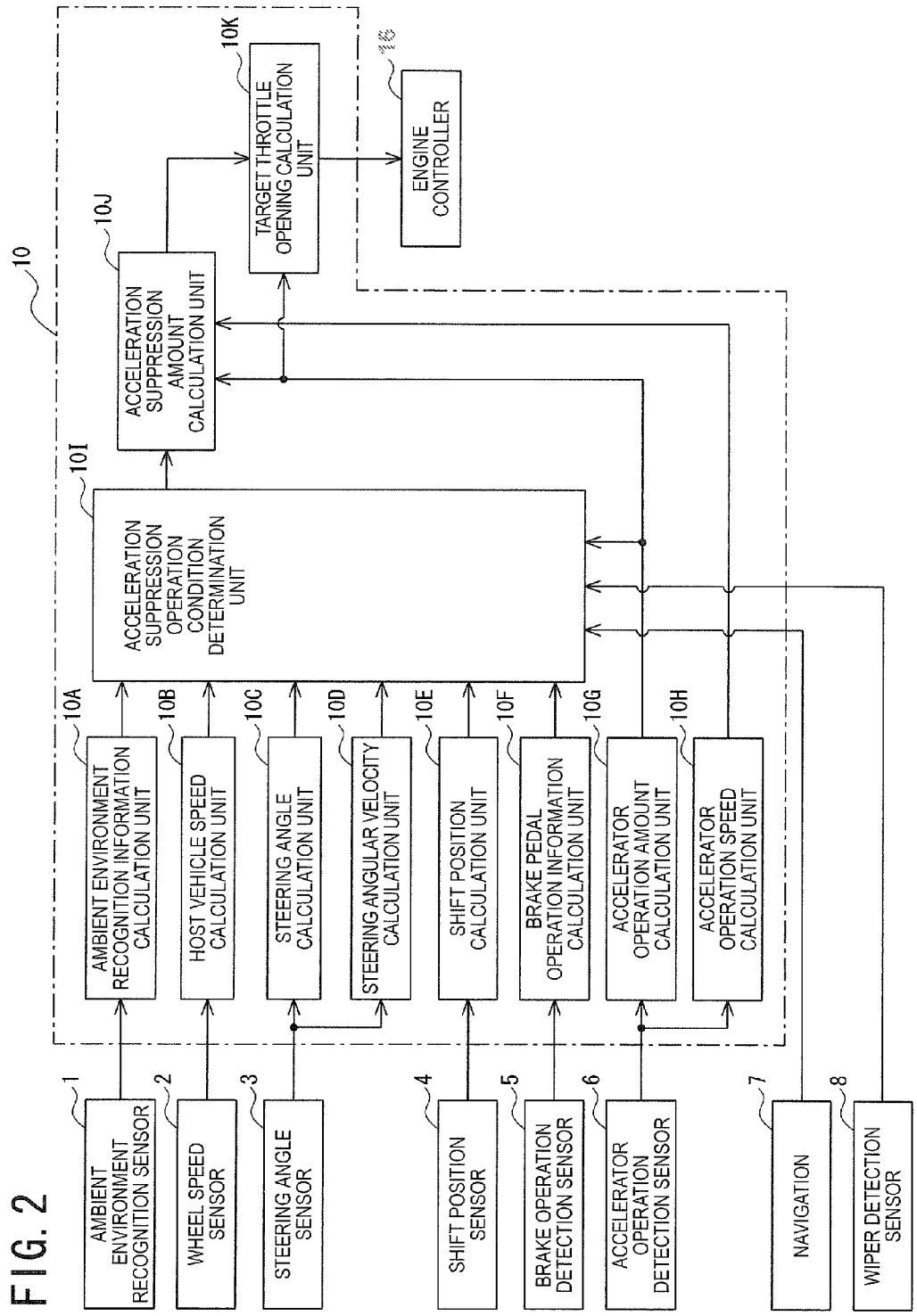
FIG. 2 is a diagram for describing the configuration of a traveling controller according to an embodiment of the invention.

As illustrated in FIGS. 1 and 2, the vehicle includes an ambient environment recognition sensor 1, a wheel speed sensor 2, a steering angle sensor 3, a shift position sensor 4, a brake operation detection sensor 5, an accelerator operation detection sensor 6, a navigation device 7, and a wiper detection sensor 8. The vehicle further includes a traveling controller 10.

The ambient environment recognition sensor 1 recognizes an obstacle or a road surface in the periphery of a host vehicle MM, and outputs the recognized peripheral state to the traveling controller 10. The ambient environment recognition sensor 1 of this embodiment is constituted by one or two or more cameras which can image the periphery of the vehicle. The cameras 1 are provided, for example, the positions of side mirrors, the front portion, rear portion, roof portion of the vehicle, and the like. Each camera 1 images the periphery of the vehicle at every preset imaging time interval to acquire a captured image.

Figure 3:
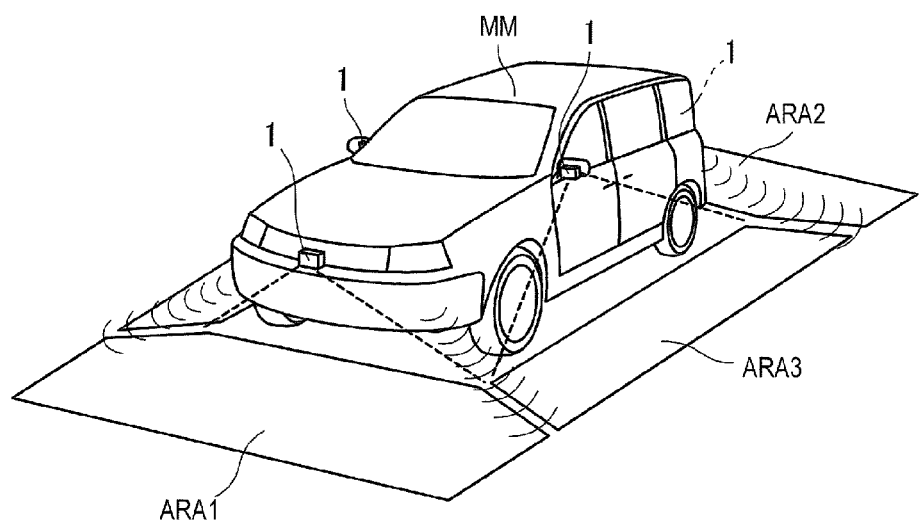
FIG. 3 is a perspective view illustrating an example of imaging by a camera.
Figure 4:
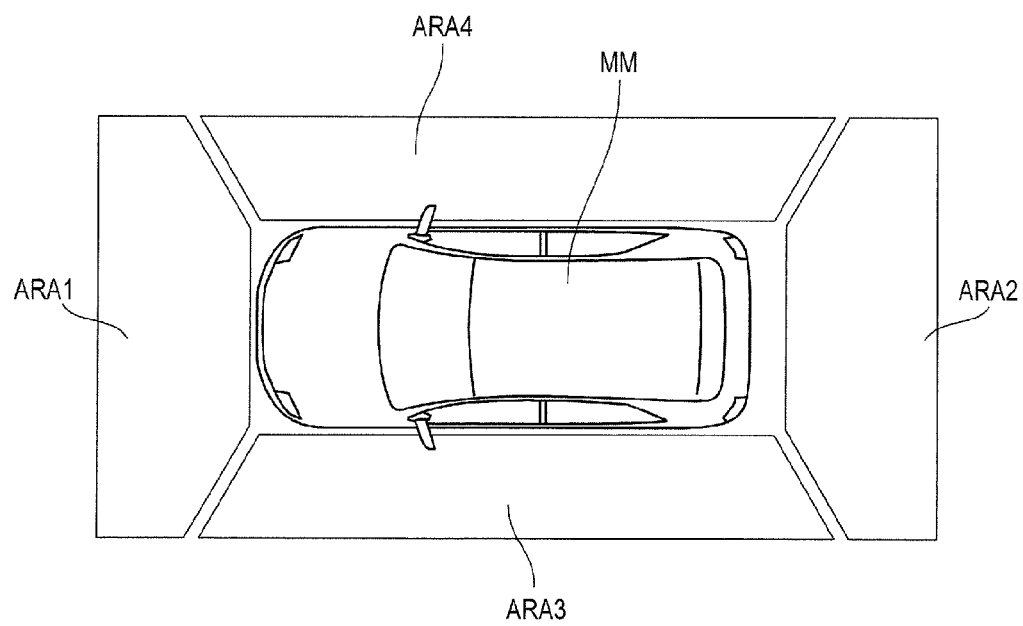
FIG. 4 is a plan view illustrating an example of an imaging area in the periphery of the vehicle.

In this embodiment, as illustrated in FIG. 3, the cameras are respectively disposed at four locations of front, rear, right, and left as the ambient environment recognition sensor 1. As illustrated in FIG. 4, the area in the periphery of the vehicle is divided into four areas ARA1 to ARA4, and the cameras 1 respectively image the areas ARA1 to ARA4. The imaging areas of the cameras 1 may have an overlap portion. A separate camera for imaging the distant side of the vehicle (for example, to 100 m) may be provided. A captured image may not be an image including the entire area captured by each camera 1, and may be an image cut from video captured by each camera 1.

In this embodiment, an area on the front side in the travel direction of the host vehicle MM is an area where information for detecting a parking frame is acquired. In the following description, as an illustration, a case where a parking frame is detected based on a captured image obtained by imaging the area ARA1 on the front side of the host vehicle will be described. When the vehicle approaches a parking frame with backward movement, a captured image of the area ARA2 is used to detect a parking frame.

The wheel speed sensor 2 detects a wheel speed and outputs the detected wheel speed information to the traveling controller 10. The wheel speed sensor 2 is constituted by, for example, a pulse generator, such as a rotary encoder, which measures a wheel speed pulse.

The steering angle sensor 3 detects the steering angle of a steering wheel 20 and outputs the detected steering angle information to the traveling controller 10. The steering angle sensor 3 is provided for each steering shaft. A turning angle of a steered wheel may be detected as steering angle information.

The shift position sensor 4 detects shift information regarding a shift position (driving instruction position, parking instruction position, neutral position, or the like) and outputs a detection signal to the traveling controller 10.

The brake operation detection sensor 5 detects the presence/absence of an operation or operation amount of a brake pedal 18. The detected brake pedal operation amount is output to the traveling controller 10. The brake pedal 18 is an operator for deceleration instruction which is operated by a driver.

The accelerator operation detection sensor 6 detects an operation amount of an accelerator pedal 19. The detected accelerator pedal operation amount is output to the traveling controller 10. The accelerator pedal 19 is an operator for acceleration instruction which is operated by the driver.

The navigation device 7 is a device which includes a GPS receiver, a map database, a display monitor, and the like, and performs route search, route guidance, and the like. The navigation device 7 can acquire information regarding the type, road width, and the like of a road, on which the host vehicle MM travels, based on the current position of the host vehicle MM obtained by the GPS receiver and road information stored in the map database.

The wiper detection sensor 8 detects the operation of a wiper. The detected wiper operation information is output to the traveling controller 10.

An information presentation device outputs an alarm and other presentations by sound or images depending on a control signal from the traveling controller 10. The information presentation device includes, for example, a speaker which provides information to the driver by buzzer sound or voice, and a display unit configured to provide information by display of images or text. As the display unit, for example, the display monitor of the navigation device 7 may be used.

The traveling controller 10 is an electronic control unit which is constituted by a CPU and peripheral components of the CPU, such as a ROM and a RAM. The traveling controller 10 includes a parking and driving assistance configured to perform driving assistance processing for parking. Of the processing of the traveling controller 10, as illustrated in FIG. 2, the parking and driving assistance unit functionally includes processing of an ambient environment recognition information calculation unit 10A, a host vehicle speed calculation unit 10B, a steering angle calculation unit 10C, a steering angular velocity calculation unit 10D, a shift position calculation unit 10E, a brake pedal operation information calculation unit 10F, an accelerator operation amount calculation unit 10G, an accelerator operation speed calculation unit 10H, an acceleration suppression operation condition determination unit 10I, an acceleration suppression amount calculation unit 10J, and a target throttle opening calculation unit 10K. These functions are constituted by one or two or more programs.

The ambient environment recognition information calculation unit 10A recognizes a road surface environment in the periphery of the vehicle based on a captured image captured by the ambient environment recognition sensor 1. The host vehicle speed calculation unit 10B calculates a vehicle speed based on a signal from the wheel speed sensor 2. The steering angle calculation unit 10C calculates a steering angle based on a signal from the steering angle sensor 3. The steering angular velocity calculation unit 10D performs a differential processing on a signal from the operation angle sensor 3 to calculate a steering angular velocity. The shift position calculation unit 10E determines a shift position based on a signal from the shift position sensor 4. The brake pedal operation information calculation unit 10F determines a brake operation amount based on a signal from the brake operation detection sensor 5. The accelerator operation amount calculation unit 10G calculates an operation amount of the accelerator pedal 19 based on a signal from the accelerator operation detection sensor 6. The accelerator operation speed calculation unit 10H performs differential processing on a signal from the accelerator operation detection sensor 6 to calculate an operation speed of the accelerator pedal 19.

The acceleration suppression operation condition determination unit 10I determines acceleration suppression operation conditions for braking and driving force control of the vehicle based on road surface environment information from the ambient environment recognition information calculation unit 10A.

Next, processing of the ambient environment recognition information calculation unit 10A will be described referring to FIG. 5. The ambient environment recognition information calculation unit 10A performs processing illustrated in FIG. 5 at every preset sampling time.

Figure 6:
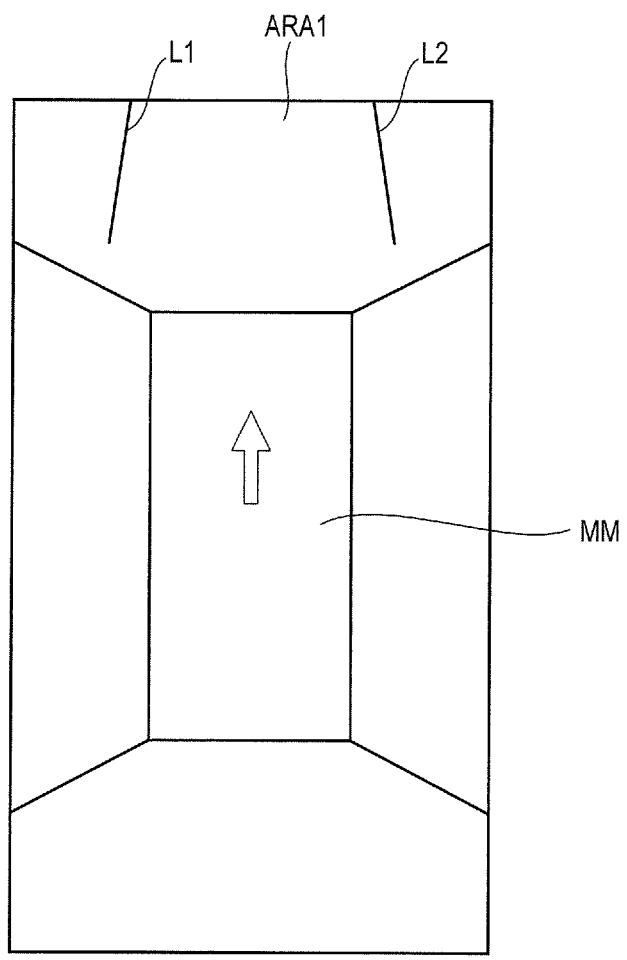
FIG. 6 is a conceptual plan view illustrating a portion to be overhead-view-converted in a captured image captured by the camera.

In Step S10, the ambient environment recognition information calculation unit 10A acquires a captured image captured by the ambient environment recognition sensor 1. In this embodiment, as illustrated in FIG. 6, a captured image obtained by imaging the area ARA1 in the travel direction of the host vehicle is used.

Next, in Step S20, the captured image acquired in Step S10 is overhead-view-converted to acquire an overhead image.

Figure 7:
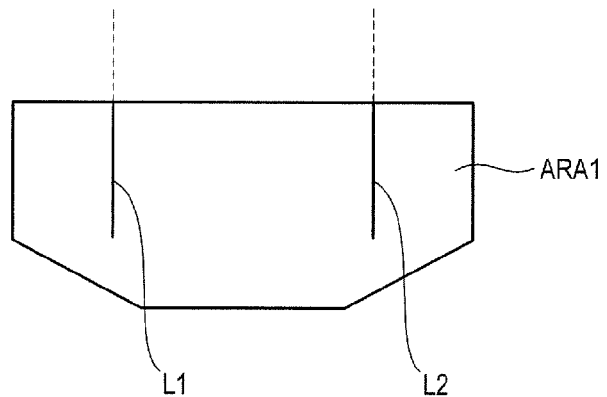
FIG. 7 is a conceptual plan view illustrating a state where the image of FIG. 6 is converted to an overhead image.

In the acquisition of the overhead image, for example, an image portion corresponding to a portion for a preset overhead area in the periphery of the host vehicle is cut from an acquired captured image (see FIG. 6), and the cut image is overhead-view-converted to obtain an overhead image illustrated in FIG. 7. In the captured image, since an object in a distant area is displayed as small, as illustrated in FIG. 6, even parallel lines are displayed as non-parallel lines. If the captured image is overhead-view-converted, as illustrated in FIG. 7, the lines are detected as parallel lines on the overhead image. In the overhead-view-conversion, for each captured image captured by each camera, an image of an overhead area portion charged to the camera may be overhead-view-converted to acquire an overhead image.

The overhead image is an image when a road surface environment is viewed from a virtual camera assuming that the camera is provided at a position looking down from the right above. For the overhead-view-conversion processing, a known conversion method, such as geometric conversion, may be used. In the overhead-view-conversion, coordinate conversion of an image is performed in a direction in which the viewpoint of the image is directed downward from above.

Next, in Step S30, a line on the overhead image is detected. Specifically, image processing is performed for extracting a line on an overhead image portion (hereinafter, referred to as a road surface overhead image) of a road surface along the travel direction of the host vehicle in the overhead image acquired in Step S20. In the image processing, a known line detection processing, such as edge processing, is performed on the road surface overhead image to detect a line on the road surface overhead image. In this embodiment, a case where the front side of the vehicle becomes the travel direction of the vehicle is illustrated.

Figure 8:
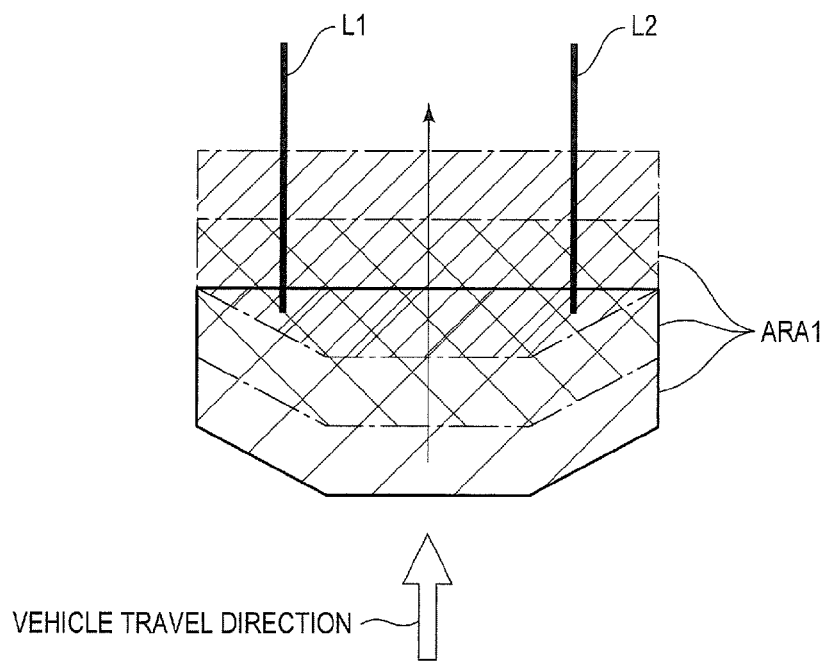
FIG. 8 is a diagram illustrating consecutive frame positions of an overhead image to be acquired.

As illustrated in FIG. 8, with the movement of the host vehicle, a road surface in the travel direction of the vehicle is sequentially displayed in road surface overhead images sequentially acquired. Of the lines of the road surface overhead images sequentially acquired, a line extending outside a window area of the image (a line which is estimated as extending in the travel direction of the vehicle) is tracked. That is, line matching processing is performed between different road surface overhead images, and it is determined whether or not lines between the road surface overhead images sequentially acquired are the same lines.

Next, in Step S40, attribute assignment processing on the detected line is performed. The attribute assignment processing will be described later.

It is determined whether or not each detected line corresponding to the following attributes, and when the detected line corresponds to an attribute, the attribute is assigned to the detected line. The assignment determination is performed for each attribute.

Examples of attributes to be assigned are as follows.
    radial line (a line extending radially centering on a light receiving unit 1a of the camera)
    solid object line (a line representing a solid object)
    luminance symmetry (symmetry of both end portions in the width direction of a detected line)
    luminance difference from a road surface
    right and left luminance difference (symmetry of luminance outside both end portions in the width direction of a detected line)
    fixed object (long) (end point where line is segmented is generated due to stain: when segmentation is long)
    fixed object (short) (end point where line is segmented is generated due to stain: when segmentation is short)
    fixed object (lens) (edge is generated due to substance stuck to lens)

As the processing of the attribute assignment unit, attribute processing of a line (referred to as a radial line) in a radial shape and a solid object line will be described.

Figure 9:
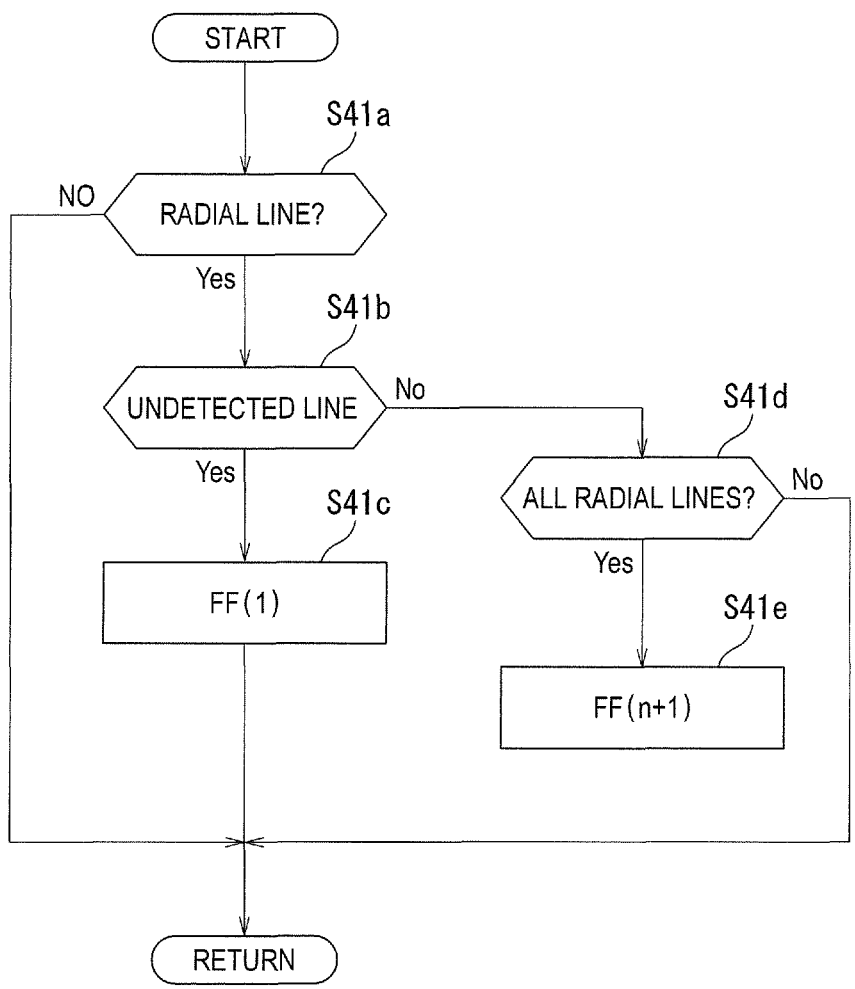
FIG. 9 is a diagram for describing radial line detection.

First, processing for attribute assignment to a radial line will be described referring to FIG. 9. When it is determined that an overhead screen previously processed is the same as an overhead screen processed at this time, the attribute assignment processing on the next radial line may not be executed. When the previous overhead screen is the same as the present overhead screen, this refers to when the vehicle is stopped or when it is considered that the vehicle is substantially stopped. That is, for example, it is possible to determine whether or not the overhead screen previously processed is the same as the overhead screen processed at this time according to whether or not the vehicle is at a speed which is estimated to be substantially stopped.

Figure 10:
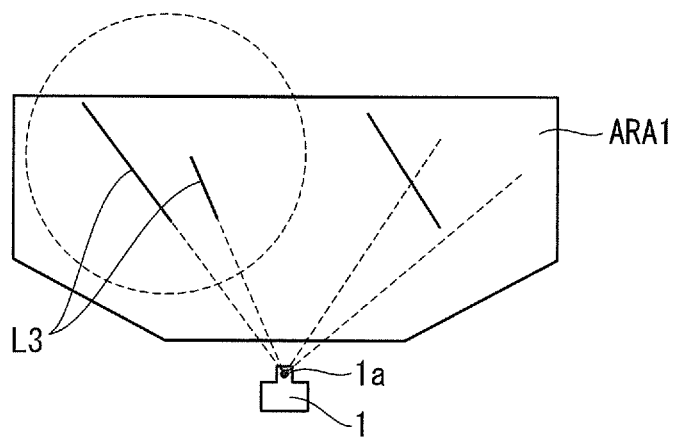
FIG. 10 is a diagram for describing a radial line.

In the attribute assignment processing of the radial line, first, of the lines on the current road surface overhead image in the overhead image, as illustrated in FIG. 10, a radial line L3 centering on an imaging center 1a (light receiving unit 1a) of the camera 1 capturing the image is detected (Step S41a).

Figure 11:
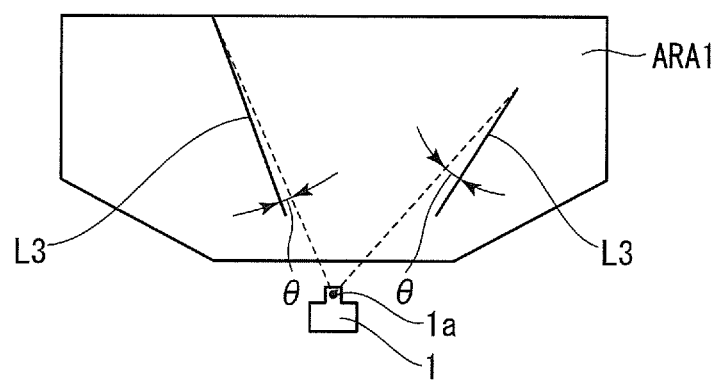
FIG. 11 is a diagram for describing radial line determination.

At this time, it is determined whether or not a line is a radial line as follows in consideration of an imaging error. That is, as illustrated in FIG. 11, when the difference from a straight line connecting an upper end point on the road surface overhead image and the imaging center is within a radial line determination threshold angle θ, the line is determined as the radial line L3. The imaging error is generated due to change in vehicle behavior.

When the target line is a line initially detected, an on threshold angle (for example, ±5 degrees) is used as the radial line determination threshold angle θ. When the target line is a line previously detected, an off threshold angle (for example, ±7 degrees) wider than the on threshold angle is used as the radial line determination threshold angle θ.

It is determined whether or not a road surface in the periphery of the host vehicle easily causes reflection, and when the road surface is in a road surface state in which reflection easily occurs, an angle greater than an angle having the above-described initial values is used as the radial line determination threshold angle θ. Alternatively, a small value is used as a threshold value of a counter n of consecutive matching determination (Step S65 described below). For example, the on threshold angle (for example, ±7 degrees) and the off threshold angle (for example, ±8 degrees) are set.

As the road surface state in which reflection easily occurs, for example, the following states can be illustrated.
  when wiper is operated due to rainfall, snowfall, or the like (for example, determination can be performed based on a signal from the wiper detection sensor 8).
  μ is low (for example, determination can be performed based on a slip amount).
  sunlight is incident on lens (for example, determination can be performed based on luminance of image).

Next, it is determined whether or not the line L3 determined as a radial line is a line initially detected in the present road surface overhead image (Step SS41b), and when the line L3 is a line initially detected at this time, an attribute FF(1) of a radial line is assigned to the line L3 (Step S41c). Here, n in a radial line attribute FF(n) is counted each time a line is determined as a radial line.

When it is determined that the line L3 determined as a radial line is detected even in the previous road surface overhead image, it is determined whether or not the radial line attribute FF(n) is assigned to the line L3 (Step S41d), and when it is determined that the radial line attribute FF(n) is assigned to the line L3, the counter value n of the radial line attribute FF(n) is counted. That is, an attribute FF(n+1) of a radial line is assigned to the line (Step S41e).

The processing of Steps S41b to S41e illustrated in FIG. 9 may be executed in Step S50 described below. In this case, in Step S40, if a line is determined as a radial line, a radial line attribute is constantly assigned, and in Step S50, it is determined whether or not a line is previously determined as a radial line. When it is determined that a line is previously determined as a non-radial line, parking frame determination is performed disregarding information of radial line attribute assignment. Alternatively, the radial line attribute is set to OFF. In processing of Step S55, it is determined whether or not the same line is consecutively determined as a radial line for a preset duration or greater.

With respect to the line L3 consecutively determined to be the attribute of the radial line (n), if it is determined that the line is moving as an edge of a solid object along vehicle motion based on the difference between the positions of the line L3 (the difference between specific positions on a line) in two road surface overhead images displaying the line L3 and information regarding vehicle motion, an attribute FR of a solid object line is also assigned to the line.

With respect to a line consecutively determined to be the attribute of the radial line (n), if it is determined that the line is moving as display on the road surface along vehicle motion based on the difference between the positions of the line (the difference between specific positions in a linear shape) in two road surface overhead images displaying the line and information regarding vehicle motion, processing which does not consider the line as a radial line may be further provided.

Figure 12:
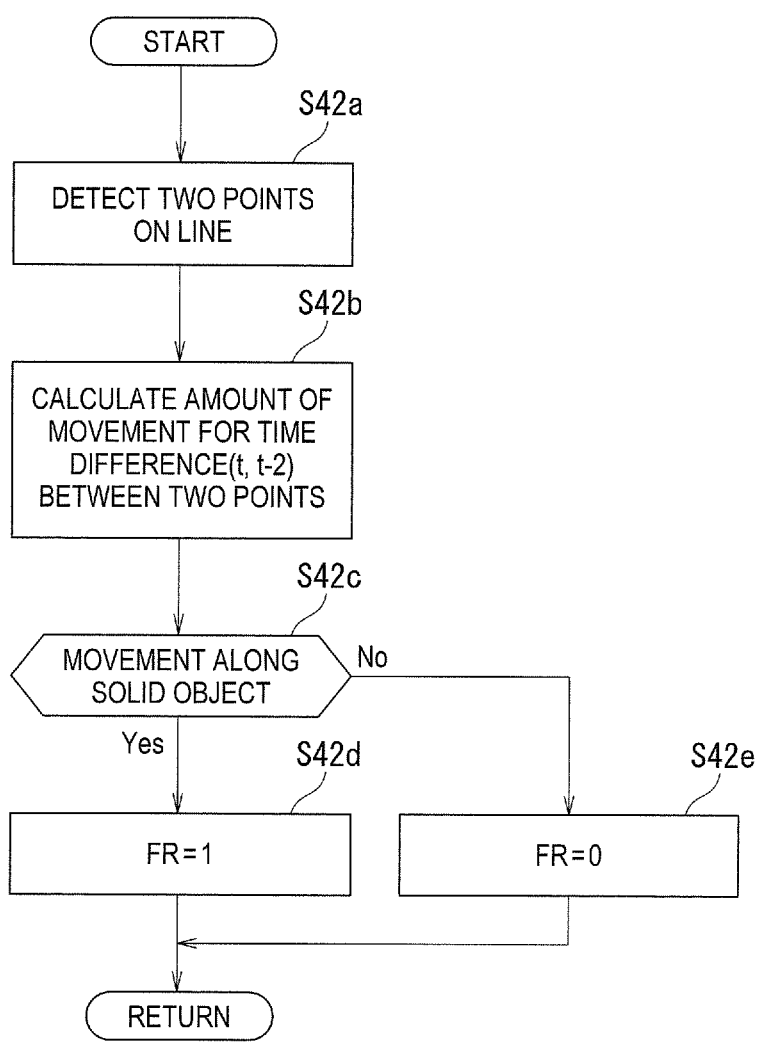
FIG. 12 is a diagram for describing solid object line determination.

Next, attribute assignment processing of a solid object line will be described referring to FIG. 12. With respect to a line in which at least an upper end or a lower end of both end portions thereof is detected based on road surface overhead images consecutively acquired, two points on the line specified based on the detected end portion are selected as a point to be tracked (Step S42a), and the amount of movement of each of the two points accompanied with the movement of the vehicle is calculated (Step S42b). The amount of movement may be the displacement of each of the two points between two overhead images acquired along with the movement of the host vehicle. It is determined that the relationship between the amounts of movement between the two points is movement along the solid object accompanied with the movement of the vehicle (Step S42c), and when the determination condition is satisfied, an attribute FR=1 of a solid object line is assigned to the line (Step S42d). The solid object is a stationary object, such as a stationary vehicle or a wall. When the relationship between the amounts of movement of the two points to be tracked is, for example, that the amount of movement of a point (lower point) close to the host vehicle is smaller than the amount of movement of a relatively distant point (upper point), it is determined to be a solid object line. A solid object line is normally a line of an edge portion of a solid object.

When a line assigned with an attribute FR of a solid object line is detected, lines attached with no attribute FR of a solid object line between the line attached with the attribute FR of the solid object line and the light receiving unit 1a of the camera in a road surface overhead image are detected, and of the detected lines, when there is a line in which the separation distance from the line attached with the attribute FR of the solid object is within a preset set separation distance (for example, 1 m), an attribute PRR of a priority frame candidate is assigned to the line. It may be determined whether or not there is a plurality of solid object lines within a preset distance, the position of the solid object may be estimated from a plurality of solid object lines, and the attribute PRR of the priority frame candidate may be assigned to a line in which the estimated separation distance from the solid object at a position in the estimated solid object on the vehicle side is within the preset set separation distance. This processing may be executed in Step S40, Step S50, or the like.

Figure 5:
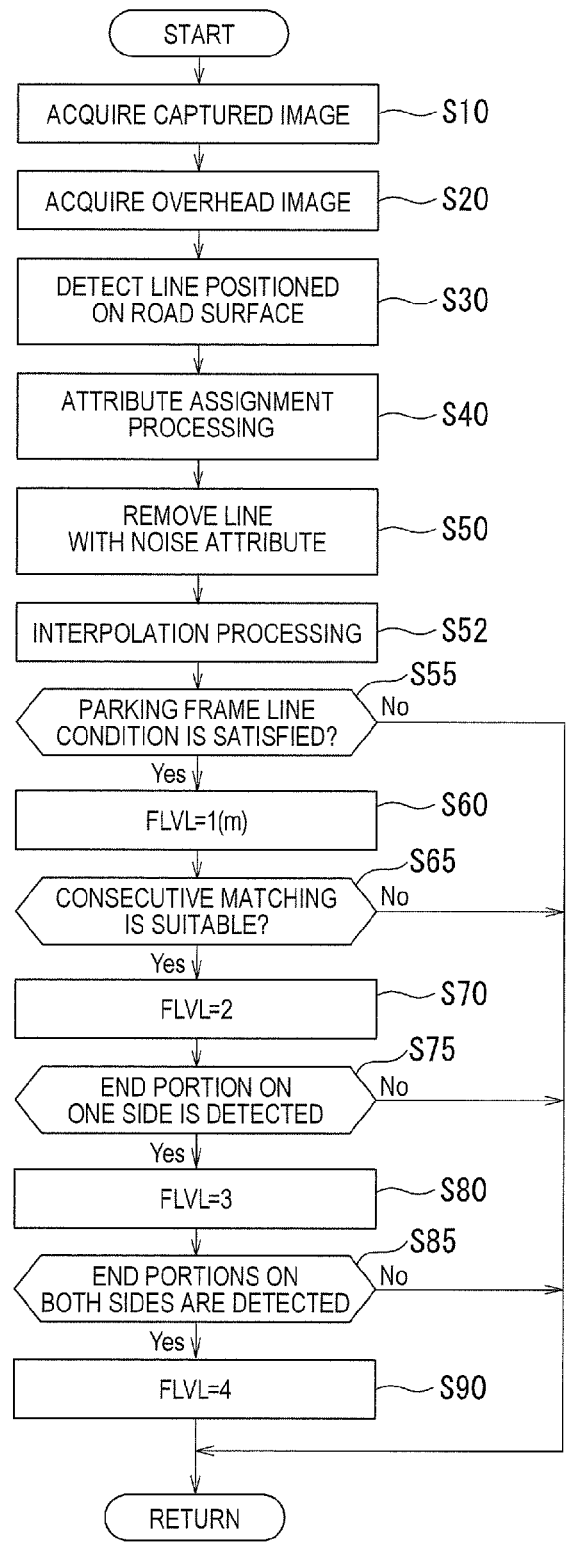
FIG. 5 is a diagram illustrating processing of an ambient environment recognition information calculation unit.

Next, in Step S50 illustrated in FIG. 5, as preprocessing of parking frame setting, the line assigned with the attribute FF(n) of the radial line (n: for example, n=3 or greater) or the attribute FR of the solid line is excluded from lines of frame line candidates.

Next, in Step S52, line interpolation processing is performed. This is processing for interpolating line blurring. That is, interpolation is performed between a plurality of lines detected along the same virtual straight line, that is, between lines which are likely to be the same line.

Figure 26:
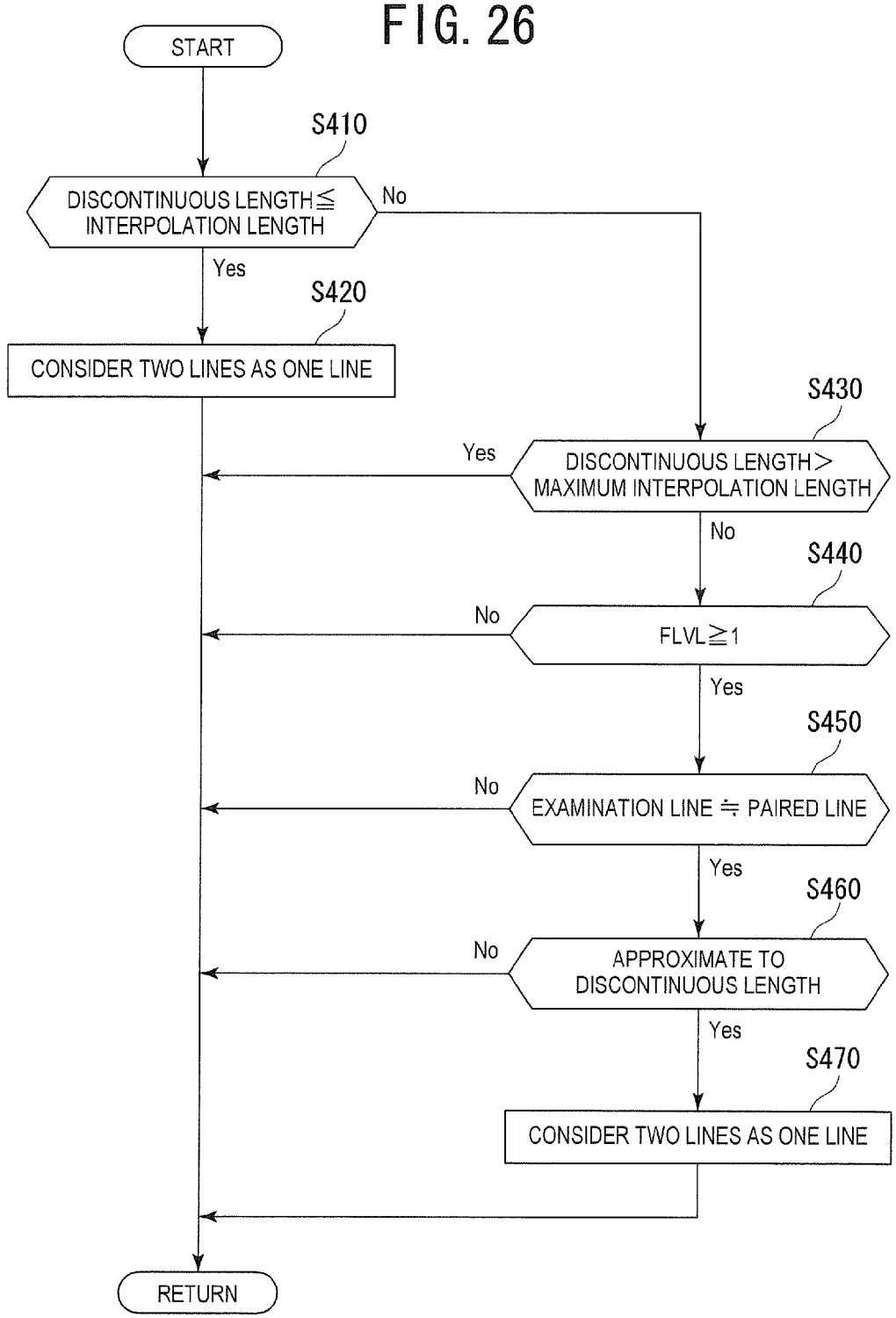
FIG. 26 is a diagram for describing a processing example for detecting a line corresponding to a crossing related display line.

The line interpolation processing will be described referring to FIG. 26. First, it is determined whether or not the length (referred to as a discontinuous length) of a space between two adjacent straight lines positioned along the same virtual line is equal to or less than a preset interpolation length (Step S410), and when the discontinuous length is equal to or less than the interpolation length, line interpolation is performed to perform processing which considers the two lines as one line (Step S420). The interpolation length is set to a value shorter than a line width (including a margin for a wheel passing through a line) at a crossing. The interpolation length is set to, for example, 20 cm. Lines in which the discontinuous length exceeds the interpolation length are processed as follows.

First, it is determined whether or not the discontinuous length exceeds a preset maximum interpolation length (for example, 1 m) (Step S430), and when the discontinuous length exceeds the maximum interpolation length, the interpolation processing is not performed. That is, the lines are processed as separate lines.

For lines in which the discontinuous length is longer than 20 cm and within the maximum interpolation length, the suitability of the interpolation processing is determined as follows. That is, it is determined whether or not at least one straight line of the two straight lines at a space is a straight line in which a parking line level FLVL is equal to or greater than 1 (Step S440). When there is no straight line in which the parking line level FLVL is equal to or greater than 1, interpolation is not performed.

Next, when a straight line in which the parking line level FLVL is equal to or greater than 1, that is, a paired straight line of a frame line candidate is detected, of the two straight lines with a space, a straight line (referred to as an examination line) with both ends found is compared with a line paired with the straight line. The examination line is normally a straight line previously detected.

When the length of the examination line is approximated to the length of the paired line (Step S450), and the discontinuous length between adjacent lines in the extension direction on the paired line side is approximated to a discontinuous length on the examination line side (Step S460), interpolation of both lines is performed to perform processing which considers the two lines as one line, and information regarding the presence of a crossing is attached to the line (Step S470). When there is a line with information regarding the presence of a crossing within a preset range in the periphery of the host vehicle, a crossing flag FC is turned ON. In contrast, when there is no line with information regarding the presence of a crossing within the preset range in the periphery of the host vehicle, the crossing flag FC is turned OFF. The preset range in the periphery of the host vehicle is, for example, within a radius of 6 m centering on the host vehicle.

When the examination line is approximated to the paired line, this refers to when the length of the examination line and the length of the paired line are considered as substantially the same length, and for example, it is determined that the examination line is approximated to the paired line when the difference in length between the examination line and the paired line is equal to or less than a preset threshold value. When the discontinuous length is approximated, this refers to when the discontinuous length is considered as substantially the same length, and for example, it is determined whether or not the discontinuous length is approximated when the difference in the discontinuous length is equal to or less than a preset threshold value.

Next, in Step S55, processing is performed regarding whether or not a line which is detected in the processing of the road surface overhead images consecutively acquired is a line of a frame line candidate.

It is determined whether or not the following preset parking frame conditions are satisfied. The processing regarding whether or not a line is a line of a frame line candidate is performed, for example, for a line positioned in a preset parking frame presence determination area (for example, an area within a radius 10 m centering on the host vehicle) with respect to the host vehicle.

That is, in Step S55, when all of the following parking frame line conditions are satisfied, it is determined that a line is a line of a parking frame line candidate. When it is determined that a line is a line of a parking frame line candidate, in Step S60, "1(n)" is set to the parking line level FLVL as attribute information of the line. The initial value of the parking line level FLVL is "0". Furthermore, n of LVL1($n$) becomes n=1 when it is determined to be a parking frame line candidate initially, and is counted each time it is determined to be a parking frame line candidate. In contrast, for a line in which it is determined that the parking line level FLVL is "1(n)", n is counted each time it is determined that the parking frame line conditions are not satisfied.

Parking Frame Line Condition

A line is a line which is estimated as a straight line.

A line width is within a preset range of a line (a range of a width of a line considered as a line of a parking frame, for example, 2 cm to 4 cm).

There is a paired line within a preset separation range (a range capable of being considered as a line paired with a parking frame, for example, 1.5 m to 2.5 m).

Parallelism of a pair of lines is within a preset allowable angle (for example, within 4 degrees).

When corresponding end portions of a pair of lines are detected, a shift amount in the extension direction of the lines at both end points is equal to or less than a preset shift amount (for example, 50 cm).

The difference in line width between a pair of lines is equal to or less than a preset value (for example, 8 mm).

The length of a line is equal to or less than a preset maximum length (for example, 9 m).

A line is a line which has no information regarding the presence of a crossing.

A line which is detected as a line of a parking frame is a line which is estimated as a line (a line lateral to the vehicle during parking) in a direction along the front-back direction of the vehicle when the vehicle is parked. Moreover, since the line width is confirmed, it is possible to detect the shape or the like of the end portion of the line.

When a target line has an attribute PRR of a priority frame candidate, the following parking frame line conditions are mitigated and it is determined whether or not a line is a parking frame line candidate. The mitigation refers to when determination is performed with wider values set below. For example, determination is performed with the allowable angle of the parallelism, for example, within 6 degrees.

Next, in Step S65, with respect to a line in which the parking line level FLVL is "1(n)", it is determined whether or not the variable n is equal to or greater than a preset threshold value (for example, n=3 or greater with a sampling cycle of 100 msec). When the line satisfies the conditions, in Step S70, with respect to a line in which the variable n is equal to or greater than the preset threshold value, the parking line level FLVL is set and changed to 2. The preset threshold value is set to, for example, a value at which a preset length (for example, 2 m) or greater can be detected as the length of a line. Instead of performing determination based on the magnitude of the counter n, it may be determined whether or not the length of a line equal to or greater than the preset length is detected, and with respect to a line which is estimated that the length of a line equal to or greater than the preset length (for example, 2 m) can be detected, when the parking line level FLVL is "1(n)", the parking line level FLVL may be set and changed to 2. Alternatively, when it is determined to be the same straight line with the movement distance of the vehicle within a preset set movement distance, with respect to a line in which the parking line level FLVL is "1(n)", the parking line level FLVL may be set and changed to 2.

When the length of a line is equal to or greater than a preset maximum length (for example, 9 m), the parking line level FLVL is forcedly changed to "0" regardless of the level of the parking line level FLVL.

Next, in Step S75, with respect to a line in which the parking line level FLVL is 2, when one of both end portions is detected, the process progresses to Step S80, and in Step S80, the parking line level FLVL is changed to 3.

In the detection of the end portion, it may be found as an end portion only when the shape is a preset specific shape. An example of the specific shape is an end portion of a mere line, a U shape, a T shape, or the like.

Next, in Step S85, with respect to a line in which the parking line level FLVL is 3, when both end portions are detected, the process progresses to Step S90, and in Step S90, the parking line level FLVL is changed to 4.

Figure 13:
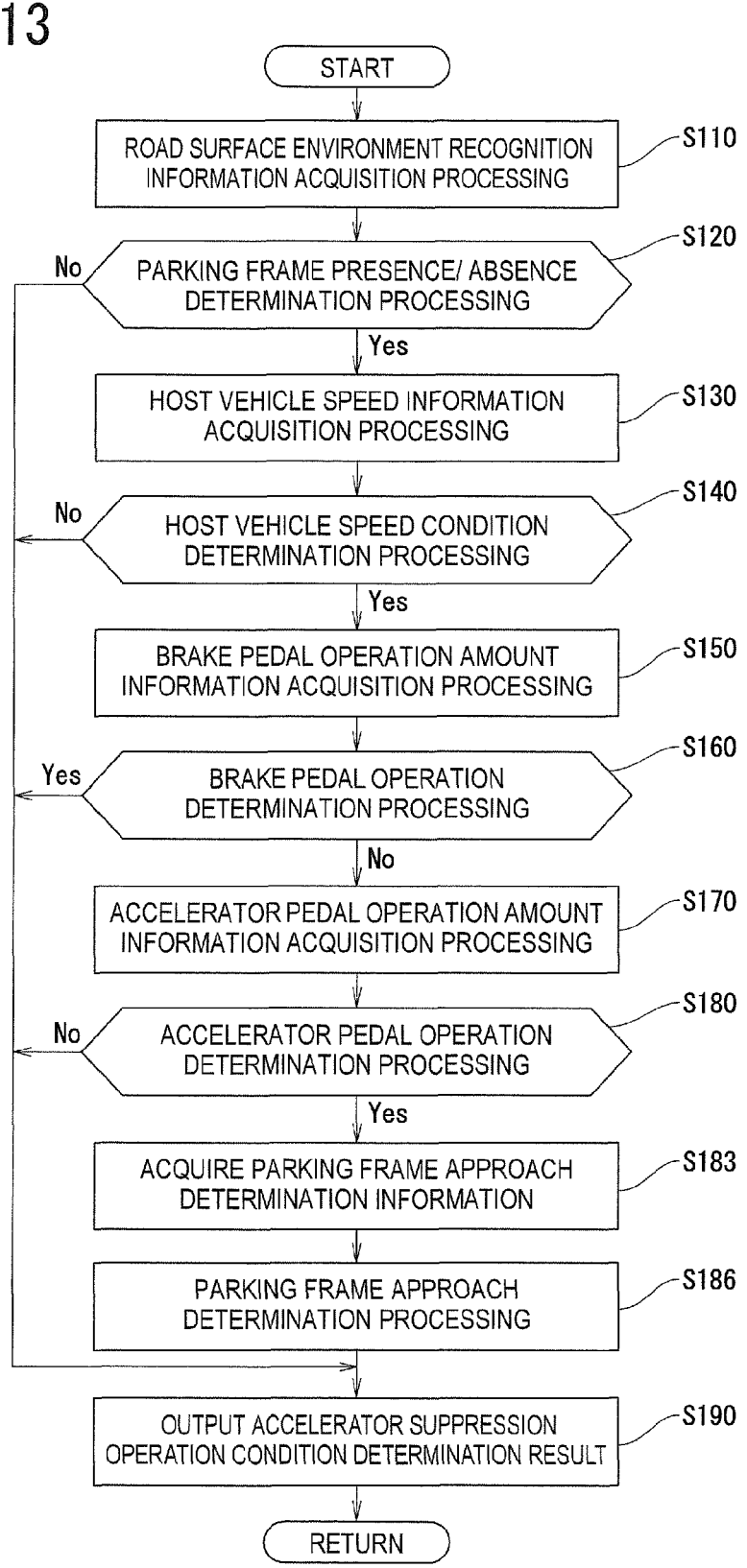
FIG. 13 is a diagram for describing processing of an acceleration suppression operation condition determination unit.

Next, processing of the acceleration suppression operation condition determination unit 10I will be described referring to the drawings. The acceleration suppression operation condition determination unit 10I performs processing illustrated in FIG. 13 at every preset sampling time.

In Step S110, the acceleration suppression operation condition determination unit 10I acquires frame line information with the parking line level FLVL equal to or greater than 1 as road surface environment recognition information calculated by the ambient environment recognition information calculation unit 10A.

Next, in Step S120, the presence/absence of a parking frame is determined based on the frame line information acquired in Step S110. When there is frame line information with the parking line level FLVL equal to or greater than 3, it is determined that there is a parking frame and the process progresses to Step S130. Since there is no frame line information with the parking line level FLVL equal to or greater than 3, when it is determined that there is a reliable parking frame, or when the crossing flag FC is ON, it is determined that the acceleration suppression operation conditions are not established, the process progresses to Step S190, and in Step S190, an acceleration suppression operation condition determination result (=the acceleration suppression operation conditions are not established) is output to the acceleration limit value calculation unit 10J.

Next, in Step S130, the speed of the host vehicle MM is acquired from the host vehicle speed calculation unit 10B.

Next, in Step S140, host vehicle speed condition determination is performed based on the host vehicle speed acquired in Step S130. For example, when the host vehicle speed is less than a preset value, the process progresses to Step S150, when the host vehicle speed is equal to or greater than the preset value, it is determined that the acceleration suppression operation conditions are not established and the process progresses to Step S190, and in Step S190, an acceleration suppression operation condition determination result (=the acceleration suppression operation conditions are not established) is output to the acceleration suppression amount calculation unit 10J. The preset value is, for example, 15 [km/h].

Next, in Step S150, brake pedal operation information is acquired from the brake pedal operation information calculation unit 10F.

Next, in Step S160, determination regarding the brake pedal operation is performed based on brake pedal operation information acquired in Step S150. When it is determined that there is no brake pedal operation, the process progresses to Step S170. When it is determined that there is a brake pedal operation, it is determined that the acceleration suppression operation conditions are not established and the process progresses to Step S190, and in Step S190, the acceleration suppression operation condition determination result (=the acceleration suppression operation conditions are not established) is output to the acceleration suppression amount calculation unit 10J.

In Step S170, an accelerator operation amount is acquired from the accelerator operation amount calculation unit 10G.

Next, in Step S180, determination regarding the accelerator operation amount is performed based on the accelerator operation amount acquired in Step S170. For example, when the accelerator operation amount is equal to or greater than a preset value, it is determined that the acceleration suppression operation conditions are established. When the accelerator pedal operation amount is less than the preset value, it is determined that the acceleration suppression operation conditions are not established and the process progresses to Step S190, and in Step S190, the acceleration suppression operation condition determination result is output to the acceleration suppression amount calculation unit 10J. The preset value is set to, for example, an operation amount corresponding to 3[%] of an accelerator opening of the accelerator pedal 19.

Next, in Step S183, parking frame approach determination information is acquired. In this embodiment, parking frame approach determination is performed based on the steering angle, the angle between the host vehicle MM and the parking frame, and the distance between the host vehicle MM and the parking frame.

Figure 14:
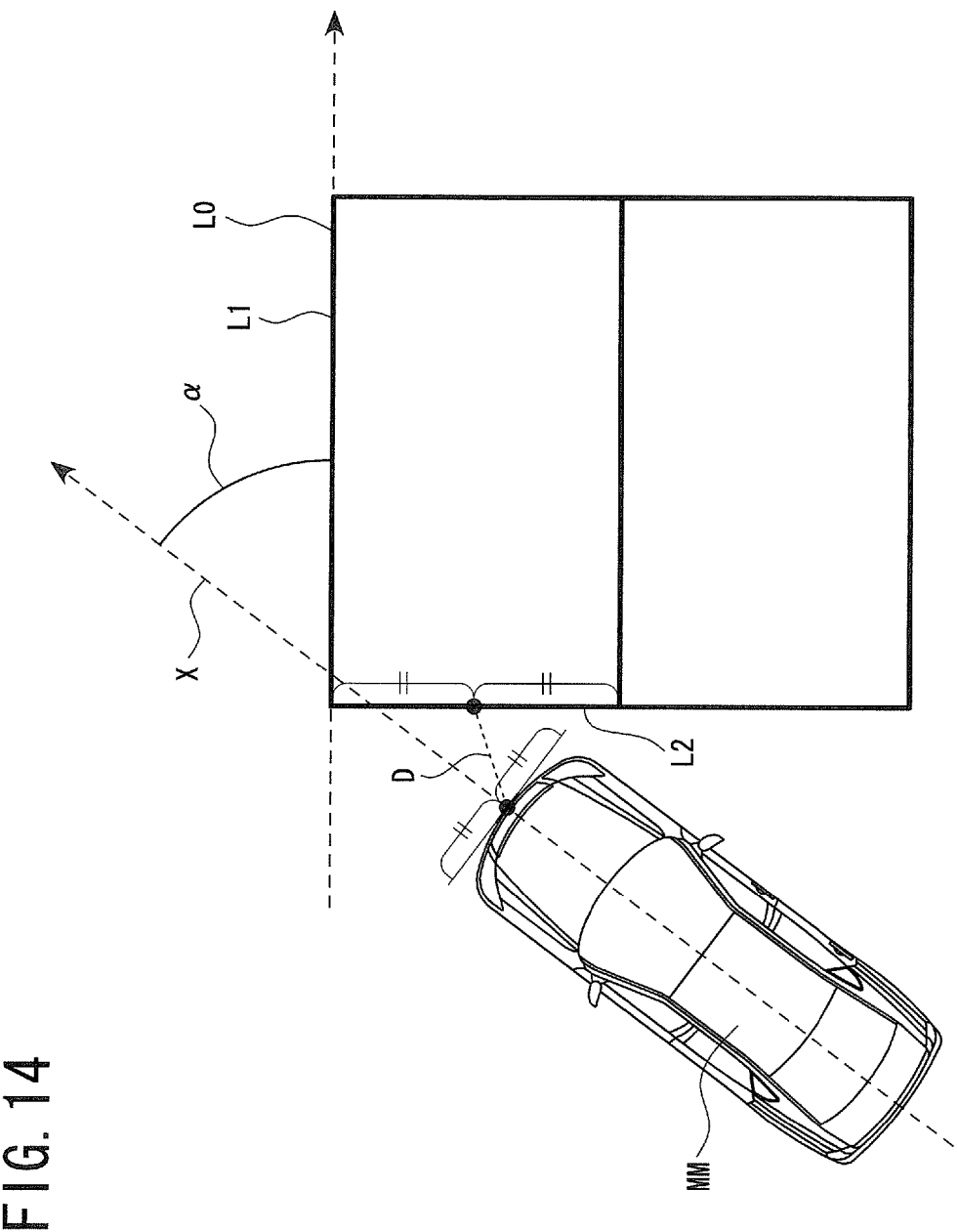
FIG. 14 is a diagram for describing a host vehicle, a parking frame, and the distance between the host vehicle and the parking frame.

Specifically, in Step S183, the steering angle is acquired from the steering angle calculation unit 10C. In Step S183, the angle α between the host vehicle MM and the parking frame L0 and the distance D between the host vehicle MM and the parking frame L0 are acquired based on the image of the periphery of the host vehicle calculated by the ambient environment recognition information calculation unit 10A. As illustrated in FIG. 14, the angle α between the host vehicle MM and the parking frame L0 is set to, for example, the absolute value of an intersection angle between a straight line (a straight line extending in the travel direction) X in the front-back direction passing through the center of the vehicle and a line on the parking frame L0 side having a frame line L1 of a portion of the parking frame L0 parallel to or substantially parallel to the front-back direction of the vehicle when parking in the parking frame L0 is completed and an extension line of the frame line L1. As illustrated in FIG. 14, the distance D between the host vehicle MM and the parking frame L0 is set to, for example, the distance between the center point of the front end surface of the host vehicle and the center point of the entrance L2 of the parking frame L0. However, the distance D between the host vehicle MM and the parking frame L0 has a negative value after the front end surface of the host vehicle passes through the entrance L2 of the parking frame L0. The distance D between the host vehicle MM and the parking frame L0 may be set to zero after the front end surface of the host vehicle passes through the entrance L2 of the parking frame L0.

The position on the host vehicle MM side for specifying the distance D is not necessarily the center point of the front end surface of the host vehicle. The distance between a preset position in the host vehicle MM and a preset position of the entrance L2 may be set as D.

In this way, in Step S183, the steering angle, the angle α between the host vehicle MM and the parking frame L0, and the distance D between the host vehicle MM and the parking frame L0 are acquired as parking frame approach determination information.

Next, in Step S186, parking frame approach determination is performed based on the parking frame approach determination information acquired in Step S183. When it is determined that the vehicle approaches the parking frame, it is determined that the acceleration suppression operation conditions are established. When it is not determined that the vehicle approaches the parking frame, it is determined that the acceleration suppression operation conditions are not established. Thereafter, the process progresses to Step S190, and the acceleration suppression operation condition determination result is output to the acceleration suppression amount calculation unit 10J.

For example, the parking frame approach determination is executed as follows. That is, in Step S186, when all of the following three conditions (a to c) are satisfied, it is determined that the vehicle approaches the parking frame.

a: within a preset set time (for example, within 20 sec.) after the steering angle detected in Step S183 becomes a value equal to or greater than a preset set steering angle (for example, 45 deg.)

b: the angle α between the host vehicle MM and the parking frame L0 is equal to or less than a preset set angle (for example, 40 deg.)

c: the distance D between the host vehicle MM and the parking frame L0 is a preset set distance (for example, 3 m)

Although a case where a plurality of conditions is used for the parking frame approach determination has been illustrated, the determination may be performed on one or more conditions among the above-described conditions. It may be determined whether or not the vehicle approaches the parking frame L0 according to the state of the speed of the host vehicle MM.

Next, the processing of the acceleration suppression amount calculation unit 10J will be described referring to the drawings. The acceleration suppression amount calculation unit 10J performs processing illustrated in FIG. 15 at every preset sampling time.

In Step S210, the acceleration suppression operation condition determination result is acquired from the acceleration suppression operation condition determination unit 10I.

Next, in Step S220, acceleration suppression processing selection information is acquired. In Step S220, for example, the accelerator operation amount is acquired from the accelerator operation amount calculation unit 10G, the accelerator operation speed is acquired from the accelerator operation speed calculation unit 10H, and the acceleration suppression operation condition determination result is acquired from the acceleration suppression operation condition determination unit 10I.

Next, in Step S230, acceleration suppression processing is selected based on the acceleration suppression processing selection information acquired in Step S220. Specifically, when it is determined that second acceleration suppression processing operation conditions are established, the process progresses to Step S240. When it is determined that the second acceleration suppression processing operation conditions are not established and first acceleration suppression processing operation conditions are established, the process progresses to Step S250. When the second acceleration suppression processing operation conditions and first acceleration suppression processing operation conditions are not established, the process progresses to Step S260.

Figure 16:
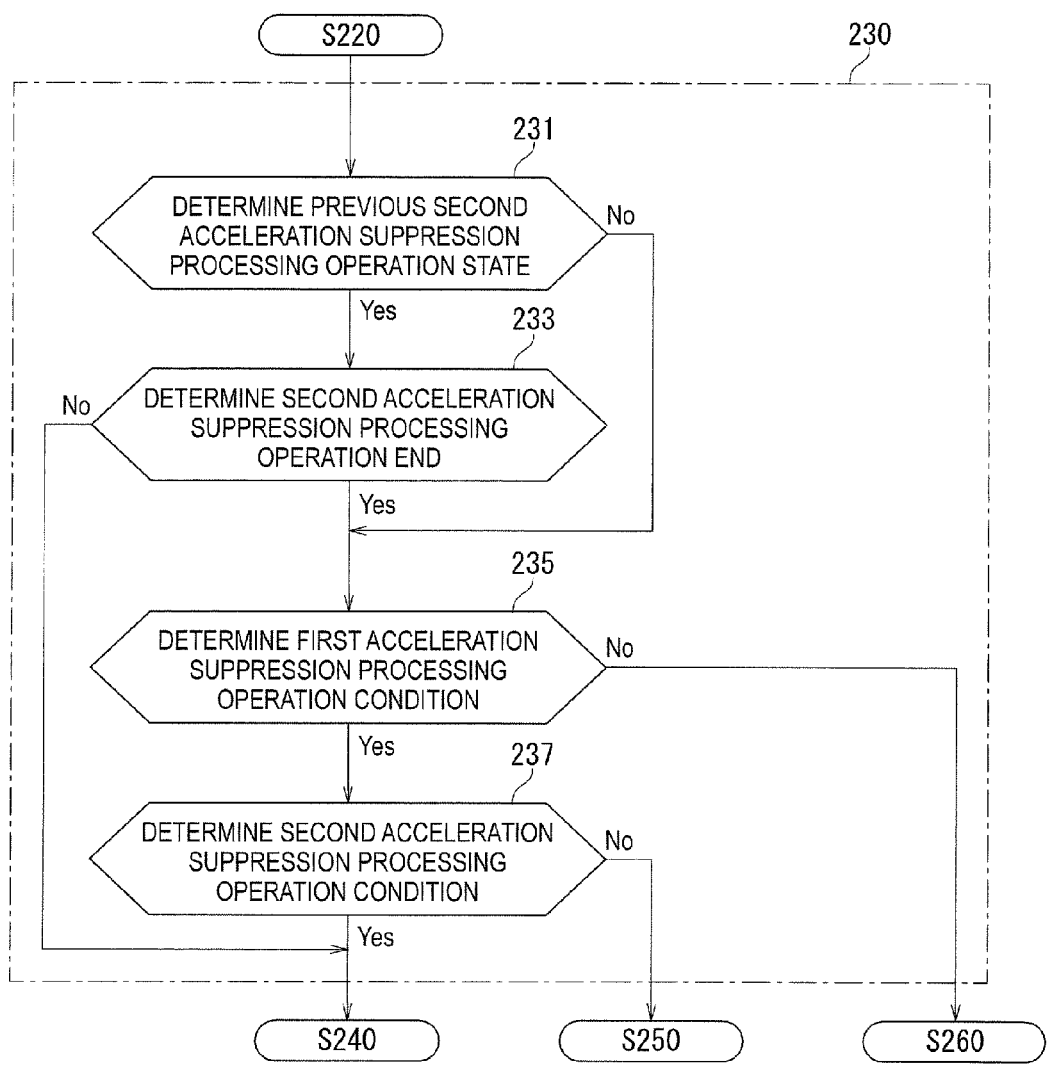
FIG. 16 is a diagram illustrating a specific example of processing of Step S230.

The processing of Step S230, in particular, the determination regarding the second acceleration suppression processing operation conditions and the first acceleration suppression processing operation conditions will be described referring to FIG. 16.

First, in Step S231, during determination processing at a previous control cycle, it is determined whether or not second acceleration suppression processing is operated. In the determination at the previous control cycle, when the second acceleration suppression processing is operated, the process progresses to Step S233. In the determination at the previous control cycle, when the second acceleration suppression processing has not been operated, the process progresses to Step S235.

In Step S233, determination regarding the end of the second acceleration suppression processing operation when the previous second acceleration suppression processing is operated is performed. Specifically, when it is determined that the accelerator operation is performed based on the accelerator operation amount acquired in Step S220, it is determined that the second acceleration suppression operation is continued and the process progresses to Step S240. When it is determined that the accelerator operation is not performed, the process progresses to Step S235 so as to perform the operation condition determination again.

In Step S235, determination regarding the first acceleration suppression processing operation condition is performed. For example, when the acceleration suppression operation condition determination result acquired in Step S210 shows that the conditions are established, it is determined that the first acceleration suppression processing operation conditions are established and the process progresses to Step S237. When the acceleration suppression operation condition determination result shows the conditions are not established, the process progresses to Step S260.

In Step S237, determination regarding the second acceleration suppression processing operation conditions is performed. For example, when all of the following conditions (d to f) are satisfied, it is determined that the second acceleration suppression processing operation is performed and the process progresses to Step S240. Otherwise, the process progresses to Step S250.

d: the acceleration suppression operation condition determination result acquired in Step S210 shows that the conditions are established e: the accelerator operation amount acquired in Step S220 is equal to or greater than a preset set operation amount (for example, the accelerator opening is 50%)

f: the accelerator operation speed is equal to or greater than a preset operation speed (for example, 200%/sec)

Figure 15:
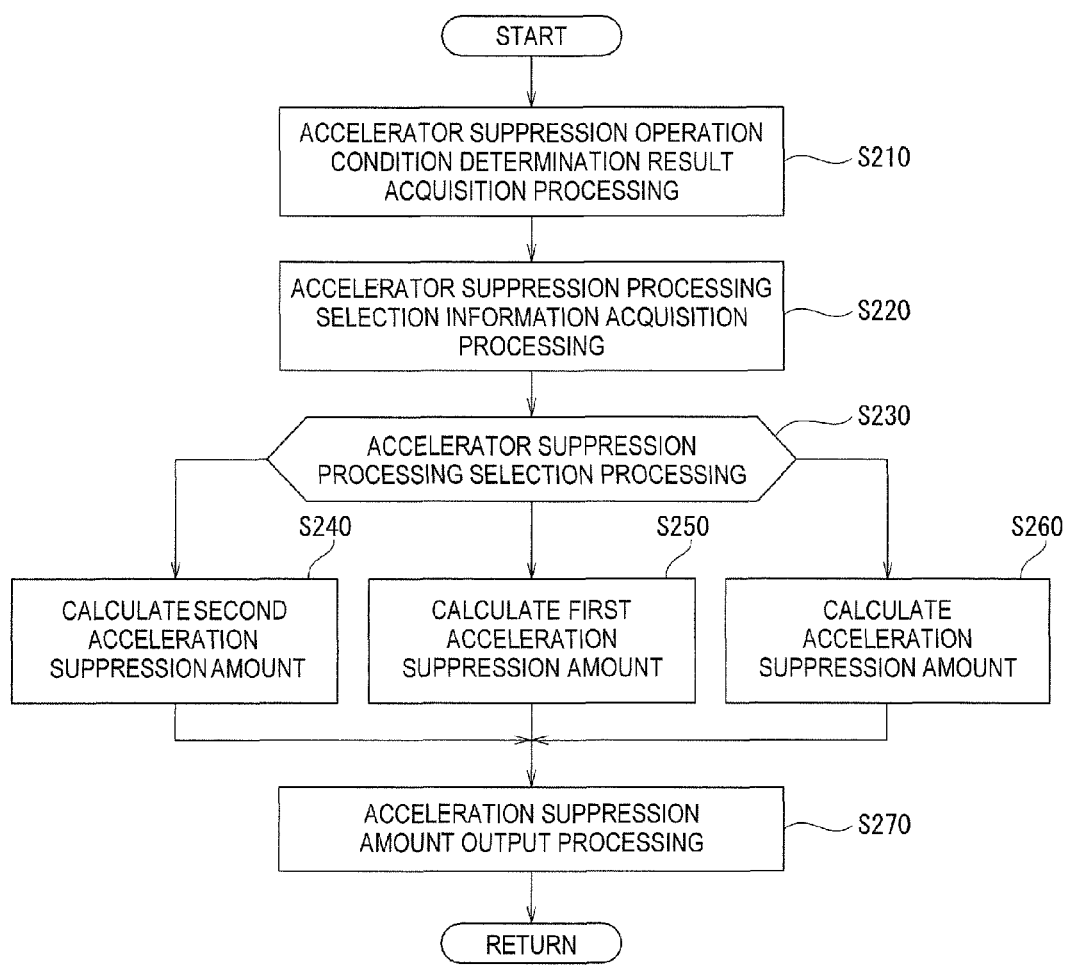
FIG. 15 is a diagram for describing processing of an acceleration suppression amount calculation unit.

In Step S240 of FIG. 15, the second acceleration suppression amount is calculated based on information acquired in Step S220, and the process progresses to Step S270.

Figure 17:
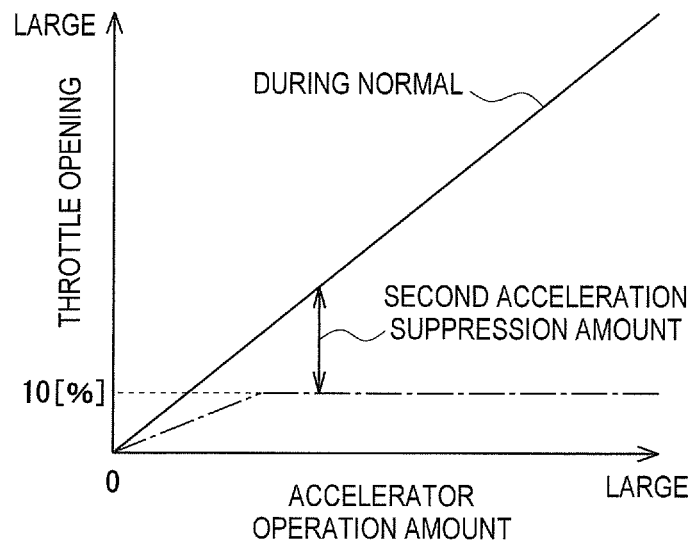
FIG. 17 is a diagram illustrating an example of a second acceleration suppression amount.

A method of calculating the second acceleration suppression amount is executed, for example, as follows. That is, an acceleration suppression amount is calculated based on the accelerator operation amount acquired in Step S220 such that the acceleration suppression amount is not greater than the preset set suppression amount, and the process progresses to Step S270. Specifically, as illustrated in FIG. 17, with respect to an acceleration operation amount less than a preset value, a throttle opening depending on an acceleration operation is calculated, and with respect to an acceleration operation (accelerator operation) equal to or greater than a preset value, the acceleration suppression amount is calculated such that an accelerator throttle opening (acceleration command value) is not greater than 10[%] regardless of an acceleration operation. In FIG. 17, a solid line indicates an accelerator operation amount and a throttle opening in a normal state, that is, in a state where suppression is not executed. A one-dot-chain line indicates the relationship between an accelerator operation and a throttle opening when second acceleration suppression is executed. That is, the difference between the solid line and the one-dot-chain line in the detected accelerator operation amount becomes the second acceleration suppression amount.

Figure 18:
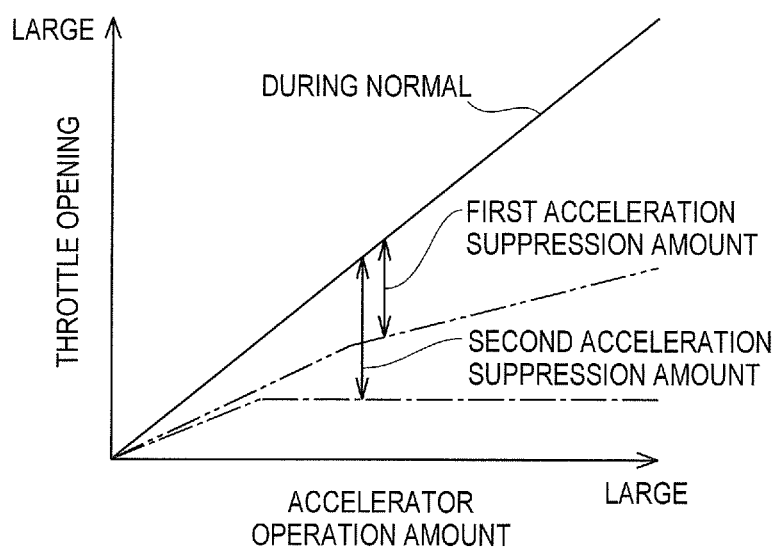
FIG. 18 is a diagram for describing an example of a first acceleration suppression amount.

In Step S250, a first acceleration suppression amount is calculated based on information acquired in Step S220, and the process progresses to Step S270. A method of calculating the first acceleration suppression amount will be described. The first acceleration suppression amount is calculated based on the accelerator operation amount acquired in Step S220 such that the throttle opening is calculated so as to be larger depending on the accelerator operation amount, and the process progresses to Step S270. Specifically, as illustrated in FIG. 18, the throttle opening (acceleration command value) is calculated so as to be larger when the accelerator operation amount is larger. In regard to the first acceleration suppression amount, an acceleration suppression amount is calculated with a relationship between an acceleration suppression amount and a throttle opening in which a suppression amount is smaller and an acceleration is greater than the second acceleration suppression amount and a suppression amount is greater and an acceleration is smaller than a normal state with no suppression with respect to the accelerator operation amount. In FIG. 18, a solid line indicates an accelerator operation amount and a throttle opening in the normal state, that is, in a state where suppression is not executed. A one-dot-chain line indicates the relationship between an accelerator operation and a throttle opening when second acceleration suppression is executed. That is, the difference between the solid line and a two-dot-chain line in the detected accelerator operation amount becomes the first acceleration suppression amount.

As illustrated in FIG. 18, the second acceleration suppression amount is greater than the first acceleration suppression amount, and as illustrated in FIGS. 17 and 18, both the first acceleration suppression amount and the second acceleration suppression amount are set so as to be greater when the accelerator operation amount is greater.

In Step S260, an acceleration suppression amount when acceleration suppression is not performed with respect to an accelerator operation is calculated, and the process progresses to Step S270. In this embodiment, the acceleration suppression amount when acceleration suppression is not performed is set to zero.

In Step S270, the acceleration suppression amount calculated in Step S202 is output to the target throttle opening calculation unit 10K.

Figure 19:
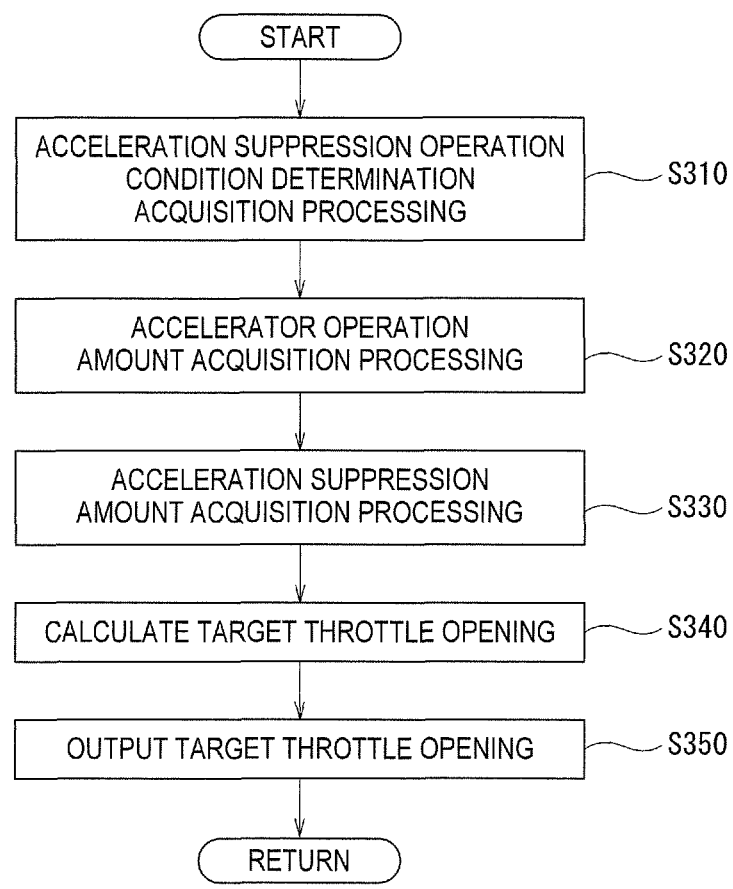
FIG. 19 is a diagram for describing processing of a target throttle opening calculation unit.

Next, processing of the target throttle opening calculation unit 10K will be described referring to the drawings. The target throttle opening calculation unit 10K performs processing illustrated in FIG. 19 at every preset sampling time.

First, in Step S310, the acceleration suppression operation condition determination result is acquired from the acceleration suppression operation condition determination unit 10I.

Next, in Step S320, the accelerator operation amount is acquired from the accelerator operation amount calculation unit 10G.

Next, in Step S330, the acceleration suppression amount is acquired from the acceleration suppression amount calculation unit 10J.

Next, in Step S340, a target throttle opening is calculated based on the acceleration suppression operation condition determination result acquired in Step S310, the accelerator operation amount acquired in Step S320, and the acceleration suppression amount acquired in Step S330. For example, when the acceleration suppression operation conditions are not established, the throttle opening based on the accelerator operation amount as in the normal state with no acceleration suppression is set as the target throttle opening. When the acceleration suppression operation conditions are established, the throttle opening based on the acceleration suppression amount is set as the target throttle opening.

For example, the target throttle opening θ* is calculated by the following expression.

$$\theta^* = \theta_1 - \Delta\theta$$

Here, θ1 represents a throttle opening depending on an accelerator operation amount, and Δθ represents an acceleration suppression amount.

Next, in Step S350, the target throttle opening θ* calculated in Step S340 is output to the engine controller 16. The engine controller 16 controls the throttle opening so as to become the acquired target throttle opening θ*, thereby controlling the engine as the driving source.

Operation and Others

Figure 20:
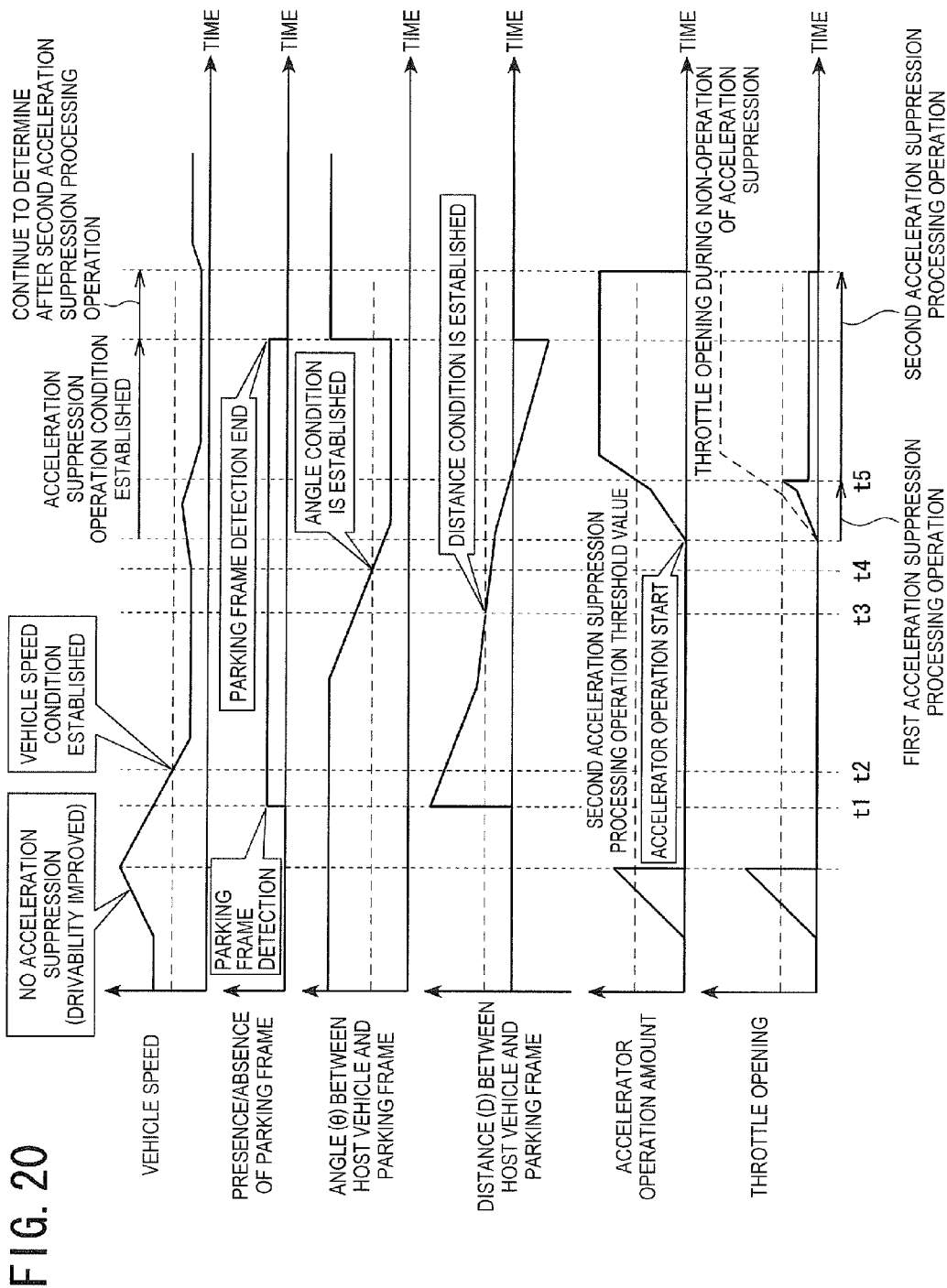
FIG. 20 is a diagram illustrating a time chart example in the first embodiment.

FIG. 20 illustrates an example of a time chart by the processing of this embodiment. This example is an example where parking frame approach detection processing detects an approach operation to the parking frame L0 based on the angle α (condition b) between the host vehicle MM and the parking frame L0 and the distance D (condition c) between the host vehicle MM and the parking frame L0.

In the example illustrated in FIG. 20, if the parking frame L0 having a preset degree of certainty (certainty factor) is detected (t1) and the vehicle speed is equal to or lower than a preset set speed (t2), determination regarding the approach operation to the parking frame L0 is performed.

When detecting the parking frame L0 having the preset degree of certainty (certainty factor), parking frame determination is performed while excluding a line having an attribute FF(n) of a radial line illustrated in FIG. 10 and a line (a line of an edge of a solid object) having an attribute of a solid object line.

At this time, there is a case where a nearby structure (a surface portion of a solid object) is reflected by a frozen road surface, a puddle, or the like, and an edge of a reflected object is displayed as a line on an overhead screen. Since a line reflected by the road surface is a light beam which constantly goes toward the vehicle even if the vehicle is moving, the line is normally recognized as a radial line centering on the light receiving unit 1*a* of the camera on an overhead image. An edge line of a solid object extending perpendicular to the road surface is recognized as a radial line on an overhead image.

From this, the radial line is excluded from a parking frame line candidate, whereby erroneous recognition due to a reflected line is suppressed and the accuracy of the parking frame determination is improved.

Figure 21:
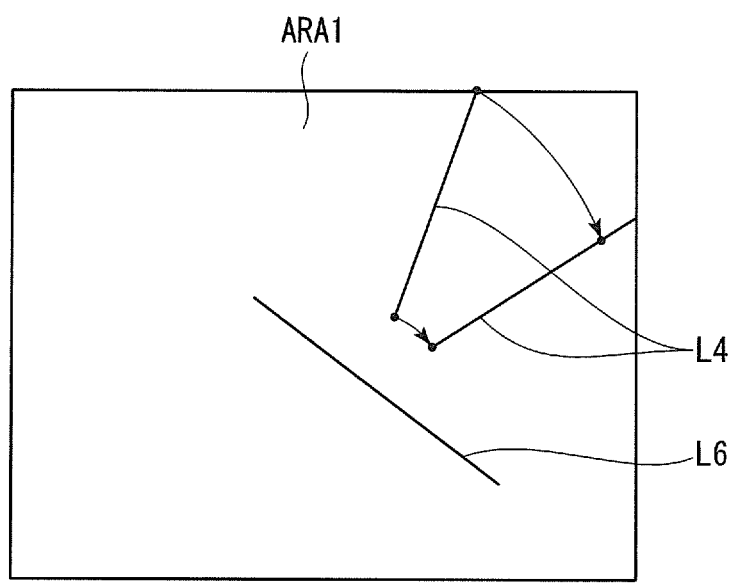
FIG. 21 is a diagram illustrating a movement example of a solid object line between frames in an overhead image.

Similarly, an edge line of a solid object is also excluded from a parking frame line candidate, whereby erroneous recognition due to the reflection of the solid object is suppressed and the accuracy of the parking frame determination is improved. As illustrated in FIG. 21, the solid object has the movement of an apparent line accompanied with the movement of the vehicle different from the movement of a line drawn on the road surface. With this, it is possible to determine whether or not a line is a line of a solid object. In an overhead-view-converted overhead image, a solid object line undergoes change accompanied with the movement of the host vehicle different from a line displayed on the road surface. Accordingly, it is possible to determine whether or not a line is a solid object line by tracking the change. Line tracking is possible insofar as two points can be specified. The two points may be both end portions of a line.

Even if two lines which are generated when a line is blurred and discontinued in the middle are interpolated as the same line, the accuracy of the parking frame determination is improved.

At this time, even if lines are separated to such an extent that it is difficult to consider that the discontinuation of the lines is caused by blurring, when a pair of lines have an approximated length and the interval of the discontinuous length is approximated, the discontinuous portion is interpolated and two line are considered as the same line and handled as a non-frame candidate.

Figure 27:
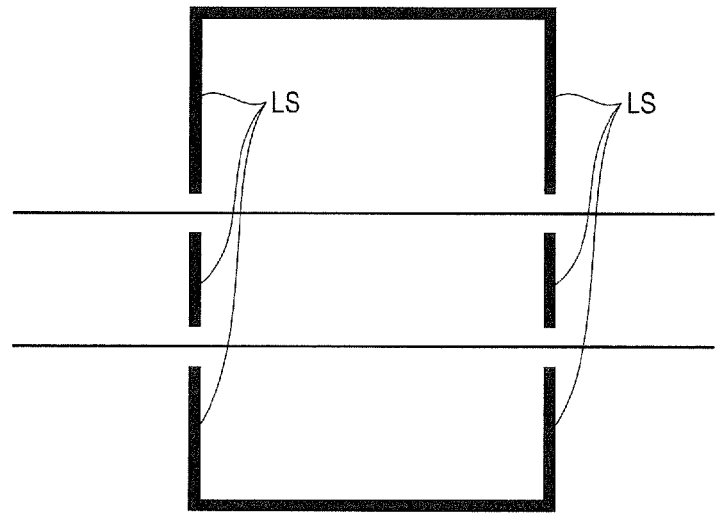
FIG. 27 is a schematic view illustrating a crossing related display line which is displayed at a crossing.
Figure 28:
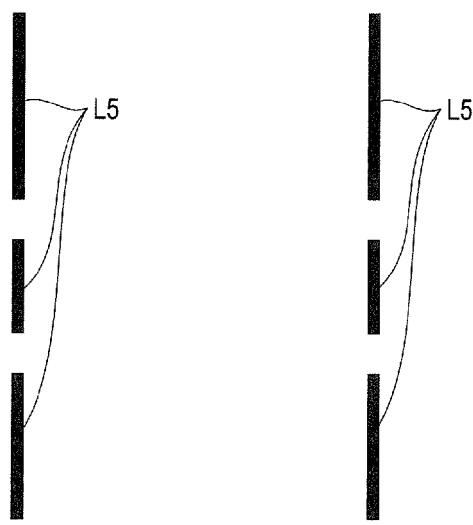
FIG. 28 is a diagram illustrating an illustration of a line corresponding to a crossing related display line detected from an overhead image.
Figure 29:
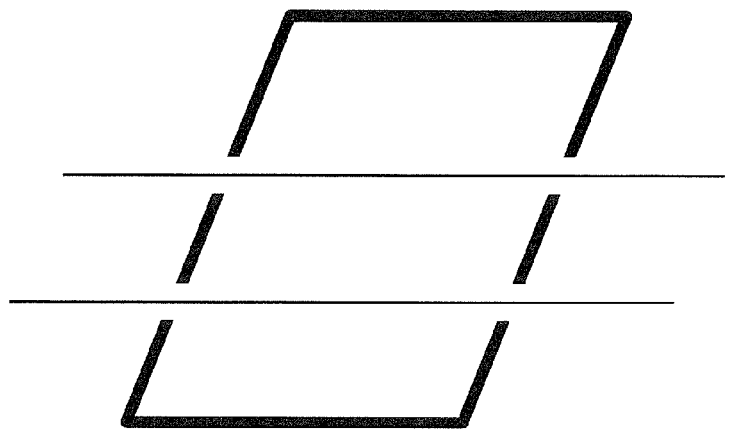
FIG. 29 is a schematic view of another example of a crossing related display line which is displayed at a crossing.

As illustrated in FIG. 27, a pair of lines Ls which is divided at a line position is continued at a crossing. In lines L5 of an overhead image, as illustrated in FIG. 28, these lines are detected as continuous divided lines. In this embodiment, the lines L5 are considered as one line, thereby avoiding a situation in which each line is individually handled as a candidate line of a parking frame. Furthermore, information regarding the presence of a parked vehicle is attached to the lines, whereby the lines are excluded from a frame line candidate of a parking frame. As illustrated in FIG. 29, while there is a case where a crossing crosses lines obliquely, since a pair of lines is detected as discontinuous lines having an approximated length, there is no problem.

Figure 22:
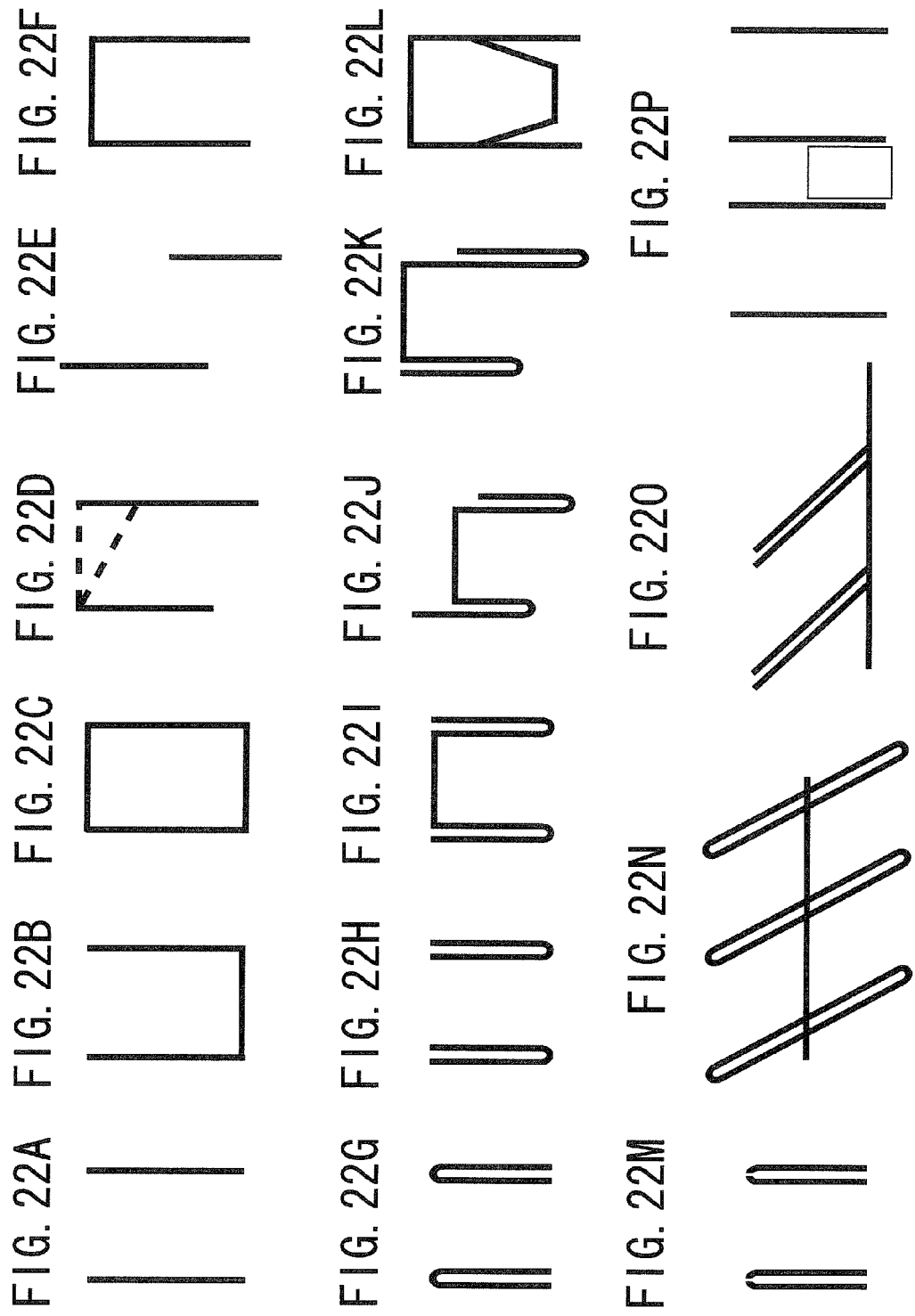
FIGS. 22A to 22P are diagrams illustrating an example of a parking frame to be detected in this embodiment.

FIGS. 22A to 22P illustrate an example where lines are detected as a parking frame by the parking frame determination of this embodiment.

Next, after the time t2, in the example illustrated in FIG. 10, if the distance D (condition c) between the host vehicle MM and the parking frame L0 is equal to or less than the preset distance (t3), and the angle α (condition b) between the host vehicle MM and the parking frame L0 is equal to or less than the preset angle (t4), it is determined to be the approach operation to the parking frame L0 and acceleration suppression is in an operation state.

Figure 23:
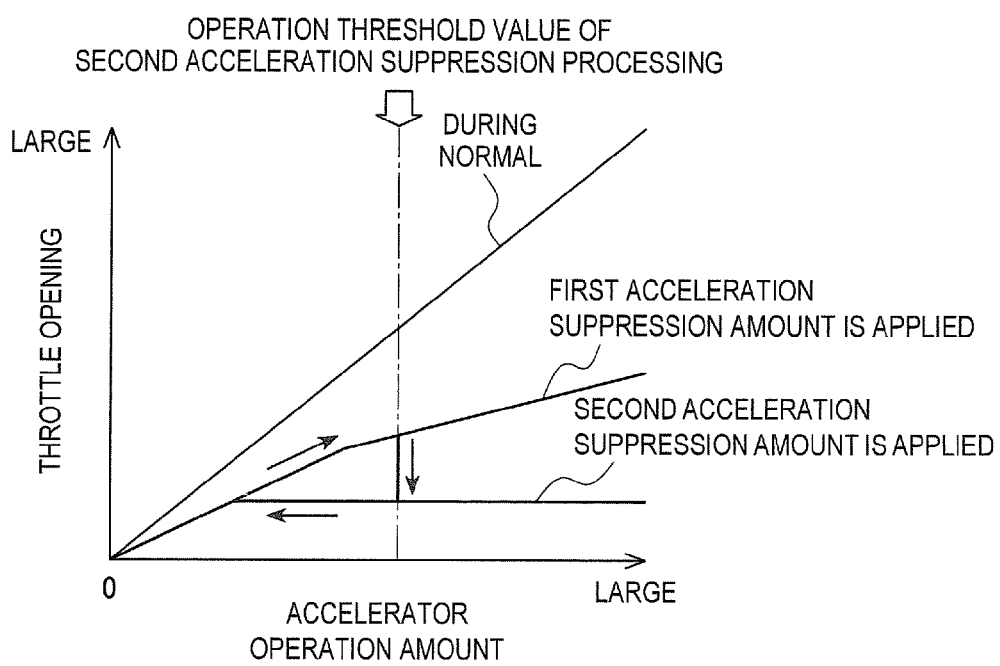
FIG. 23 is a diagram illustrating transition of an acceleration suppression amount according to an accelerator operation amount.

When the acceleration suppression is in the operation state, if the driver performs an accelerator operation, an acceleration command value (throttle opening) depending on the accelerator operation is suppressed. In a state where the acceleration suppression is being executed, if the accelerator operation amount is equal to or greater than the preset operation amount (t5), the suppression amount of the acceleration command value increases. In this embodiment, as a result of performing acceleration suppression so as to be suppressed equal to or less than the preset throttle opening, as illustrated in FIG. 23, an actual throttle opening is suppressed small compared to before the accelerator operation amount exceeds the preset operation amount. As a result, acceleration suppression against a driver's erroneous operation of the accelerator pedal 19 is more effectively executed.

FIG. 23 illustrates an example of transition of a throttle opening (acceleration suppression amount) of acceleration suppression control depending on an operation amount of an accelerator pedal. In the example illustrated in FIG. 23, even if the acceleration suppression processing transits to the second acceleration suppression processing, when the accelerator pedal is returned, and the acceleration suppression amount of the first acceleration suppression processing is equal to the acceleration suppression amount of the second acceleration suppression processing, the second acceleration suppression processing transits to the first acceleration suppression processing.

As described above, the detection of the approach operation to the parking frame L0 having a degree of certainty as a parking frame equal to or greater than the preset certainty factor, that is, the detection of the host vehicle MM approaching to the parking frame L0 is defined as the acceleration suppression operation condition. As a result, for example, even if the host vehicle MM is out of a road and approaches a parking lot, since the acceleration suppression is not performed until the approach operation to the parking frame L0 is detected, it is possible to suppress degradation of drivability accordingly. After the approach operation of the parking frame L0 is performed, the acceleration suppression is performed, whereby it is possible to realize acceleration suppression having a high acceleration suppression effect upon an erroneous operation of an accelerator pedal.

Acceleration suppression is performed in two-stages for a case where the approach operation to the parking frame L0 is detected and a case where an acceleration operation is further performed thereafter and an erroneous accelerator pedal operation is likely to occur. As a result, it is possible to perform acceleration suppression having a high acceleration suppression effect upon an erroneous operation of an accelerator pedal while suppressing degradation of drivability.

Even in a state where the vehicle is approaching the parking frame L0, while the throttle opening becomes larger depending on the acceleration operation amount, acceleration suppression is performed such that the throttle opening is smaller than normal. That is, when the acceleration operation amount becomes larger, the acceleration suppression amount becomes larger, it is possible to perform acceleration suppression having a high acceleration suppression effect with small degradation of drivability. In a state where the acceleration operation is small, since the acceleration suppression amount is small, degradation of drivability is small, and in a state where the acceleration operation is large, the acceleration suppression amount becomes larger and the acceleration suppression effect increases.

If a large acceleration operation is performed and a second acceleration suppression state is brought, acceleration suppression is performed such that the throttle opening does not become larger than a preset value (a predetermined amount greater than the acceleration operation amount determined to be a second acceleration state). As a result, it is possible to suppress the occurrence of unintended acceleration of the driver due to an erroneous acceleration operation and to perform acceleration suppression having a high accident avoidance or reduction effect. Even if the second acceleration suppression state is brought, if the acceleration operation amount becomes smaller to be less than a preset value, the first acceleration suppression state is brought.

In this way, when a large acceleration operation is performed in a state where the vehicle is approaching the parking frame L0, acceleration suppression having a greater suppression amount than the acceleration suppression amount by the first acceleration suppression processing is performed as the second acceleration suppression processing, whereby it is possible to suppress the occurrence of unintended acceleration of the driver due to an erroneous acceleration operation and to perform acceleration suppression having a higher effect of parking at an intended parking position.

The operation amount of the accelerator pedal 19 and the accelerator pedal operation speed are detected as an acceleration operation amount, whereby it is possible to distinguish between an erroneous acceleration operation and a normal operation with higher accuracy and to realize acceleration suppression having a high acceleration suppression effect with small degradation of drivability.

The approach operation to the parking frame L0 is detected from the speed of the host vehicle MM, the steering angle of the host vehicle MM, the angle α between the host vehicle MM and the parking frame L0, and the distance D between either point of the host vehicle MM and the entrance L2 of the parking frame L0, whereby it is possible to distinguish whether the driver is driving the vehicle to pass through the parking frame L0 or is about to park the vehicle in the parking frame L0 from ambient environment recognition processing and to achieve parking assistance with smaller degradation of drivability.

At this time, the angle α between the travel direction of the host vehicle MM and the parking direction to the parking frame L0 is set as the angle α between the host vehicle MM and the parking frame L0, whereby it is possible to detect the progress of the detected intrusion operation to approach to the parking frame L0 (a certainty factor of the approach to the parking frame). As a result, it is possible to determine whether or not the driver is about to park the parking frame L0 based on the detection value with high accuracy and to achieve parking assistance with smaller degradation of drivability.

As described above, although a crossing is detected from a combination of a pair of lines Ls divided at the line position as illustrated in FIG. 27, in a state where there is a preceding vehicle or an oncoming vehicle or an electric train at a crossing position, a part of a pair of lines Ls is not displayed in a captured image. For this reason, it may be determined to be a parking frame based on partial lines of a pair of lines Ls and the above-described acceleration suppression control may be performed.

Thereafter, if a preceding vehicle passes, an oncoming vehicle passes and a white line is visible suddenly, or an electric train passes and a white line is visible suddenly, and a pair of lines Ls are displayed on the screen, it is possible to recognize that there is a crossing, and thus, the above-described acceleration suppression control is cancelled.

With this, for example, when a vehicle is stopped to wait for an electric train to pass, even if a part of a pair of lines Ls is erroneously recognized as a parking frame and an acceleration suppression state is brought, the acceleration suppression control is cancelled when passing though a crossing after the electric train passes. As a result, when passing through a crossing, it is possible to avoid an insufficient acceleration due to an acceleration suppression control operation based on parking.

(Modifications)

(1) The host vehicle may have a configuration in which an obstacle, such as a preceding vehicle or an electric train, on the front side in the travel direction of the host vehicle is detected by image processing of an image, such as a captured image captured by a camera, or a distance meter. When it is detected that an obstacle detected in front of the host vehicle is moving in a direction away from the host vehicle along lines seemed to be a pair of lines Ls and a pair of lines Ls can be recognized upon the movement of the obstacle, it may be recognized that there is a crossing. That is, on the condition that a pair of lines Ls is gradually recognized on an overhead image when the obstacle moves in a direction away from the host vehicle, if a pair of lines Ls as a crossing related display line is detected, it may be determined that there is a crossing. In this case, it is assumed that the obstacle is a preceding vehicle.

When it is detected that an obstacle detected in front of the host vehicle moves in a horizontal direction in front of the host vehicle and a pair of lines Ls can be recognized upon the movement of the obstacle, it may be recognized that there is a crossing. That is, on the condition that a pair of lines Ls is gradually recognized on an overhead image when the obstacle moves in the horizontal direction (right-left direction), if a pair of lines Ls as a crossing related display line is detected, it may be determined that there is a crossing. In this case, it is assumed that the obstacle is an electric train.

(2) In the foregoing embodiment, when the parking line level FLVL is equal to or greater than 3, it is determined that there is a parking frame. When the parking line level FLVL is equal to or greater than 2, it may be determined that there is a parking frame.

(3) In the foregoing embodiment, in Step S186, as the parking frame approach determination, the determination regarding the start of the acceleration suppression control is performed by binarization of the presence/absence of the approach to a parking frame. In contrast, when there is an approach to a parking frame, the degree of certainty of the approach to the parking frame may be determined in multiple stages using an approach certainty factor ALVL representing the degree of certainty of the approach to the parking frame. The content of the acceleration suppression control may be changed depending on the approach certainty factor ALVL and the parking line level FLVL.

For example, when there is an approach to the parking frame, the approach certainty factor ALVL is classified into "low" and "high", and a total certainty factor TLVL of integral parking assistance illustrated in FIG. 24 is calculated by a combination of the certainty factor ALVL and the parking line level FLVL. Then, control for parking assistance in FIG. 25 may be performed based on the total certainty factor TLVL of parking assistance.

In the control for parking assistance illustrated in FIG. 25, when the total certainty factor TLVL is "extremely low", if the accelerator opening is equal to or greater than 80%, acceleration suppression is started to perform accelerator suppression by a preset amount (small amount). When the total certainty factor TLVL is "low", if the accelerator opening is equal to or greater than 80%, acceleration suppression is started to perform accelerator suppression by a preset amount (a value greater than when the total certainty factor TLVL is "extremely low") and accelerator suppression notification processing to the driver is performed. When the total certainty factor TLVL is "high", if the accelerator opening is equal to or greater than 50%, acceleration suppression is started to perform accelerator suppression by a preset amount (a value greater than when the total certainty factor TLVL is "extremely low") and accelerator suppression notification processing to the driver is performed. When the total certainty factor TLVL is "extremely high", if the accelerator opening is equal to or greater than 50%, acceleration suppression is started to perform accelerator suppression by a preset amount (a value greater than when the total certainty factor TLVL is "high") and accelerator suppression notification processing to the driver is performed. The percentage of the acceleration suppression execution condition (accelerator opening) illustrated in FIG. 25 is an illustration.

(4) In the foregoing embodiment, as braking and driving force control based on a detected parking frame, acceleration suppression control has been illustrated. The braking and driving force control based on the detected parking frame is not limited thereto. For example, acceleration suppression control for performing guidance assistance to a detected parking frame may be performed. The invention is not limited to the braking and driving force control for approach assistance to a detected parking frame. The braking and driving force control based on the detected parking frame may be control at the time of the start of the vehicle from the detected parking frame.

(5) In the above description, although a line is detected based on an overhead-view-converted overhead image, a line may be detected directly from a captured image before overhead-view-conversion.

(6) In the above description, a case where a crossing is detected from a line on an overhead image obtained by overhead-view-converting a captured image has been described. The crossing detection is not limited thereto. For example, a signal or the like of a line or a crossing may be detected from a captured image to detect a crossing. The ambient environment recognition information calculation unit 10A constitutes an imaging unit. The acceleration suppression operation condition determination unit 10I, the acceleration suppression amount calculation unit 10J, and the target throttle opening calculation unit 10K constitute an acceleration suppression control unit configured to perform acceleration suppression control. Step S55 constitutes a crossing detection unit and an interpolation processing unit. Step S20 constitutes an overhead image acquisition unit. Step S30 constitutes a line detection unit. Steps S52 to S90 constitute a parking frame estimation unit.

Effects of Embodiment

According to this embodiment, the following effects are obtained.

(1) The traveling controller 10 detects a line positioned on a road surface and detects a crossing based on a captured image captured by the imaging unit (camera 1). The traveling controller 10 extracts a parking frame based on the detected line and performs acceleration suppression of the vehicle based on the extracted parking frame. At this time, if the crossing is detected during the execution of the acceleration suppression control, the acceleration suppression control is cancelled. For example, if it is determined that the extracted parking frame is detected on the front side in the travel direction of the host vehicle, the acceleration suppression control is performed. According to this configuration, even if acceleration suppression is being executed based on the extracted parking frame line candidate, if it is detected that there is a crossing, the acceleration suppression is cancelled. As a result, it is possible to avoid an insufficient acceleration upon passing through a crossing.

(2) The traveling controller 10 detects a crossing related display line, which is a line displayed at a crossing position, among a plurality of detected lines to detect a crossing, and extracts a parking frame based on lines other than the line detected as the crossing related display line. According to this configuration, when a crossing is detected from a line, a parking frame is extracted by lines other than a crossing related display line. As a result, it is possible to suppress recognition of a crossing position as a parking frame.

(3) The traveling controller 10 considers two lines discontinued by a discontinuous length equal to or shorter than a preset interpolation length as one line. If two lines which are discontinued by a discontinuous length greater than the interpolation length are detected, the traveling controller 10 determines whether or not there is a line which is paired with the detected line in the width direction of the line, and when there is a paired line, and when the detected line and the paired line have the same length and a discontinuous portion on the detected line side and a discontinued portion on the paired line have the same discontinuous length, detects the line as a crossing related display line. With this, it is possible to detect a crossing related display line, that is, a crossing.

(4) The traveling controller 10 detects the crossing related display line based on an overhead image obtained by overhead-view-converting a captured image. According to this configuration, a crossing related display line is extracted from an overhead image close to an actual display state, whereby it becomes easy to extract a crossing related display line.

(5) The traveling controller 10 detects a line positioned on a road surface based on an overhead image obtained by overhead-view-converting a captured image. According to this configuration, it is possible to detect a line from an overhead image close to an actual display state. When an extraction of crossing related display line is detected from an overhead image, it becomes easy to perform line matching processing.

(6) The traveling controller 10 recognizes the environment in the periphery of the host vehicle based on detection information (image information captured by the camera) of the ambient environment recognition sensor. The traveling controller 10 detects an acceleration operation amount from the state of the acceleration operator (accelerator pedal) operated by the driver to instruct acceleration. The traveling controller 10 detects the state of the host vehicle MM. The traveling controller 10 detects the host vehicle MM approaching the parking frame L0 based on the ambient environment and the traveling state of the host vehicle MM. If it is determined that the host vehicle MM approaches the parking frame L0, the traveling controller 10 suppresses an acceleration command value (throttle opening) according to the operation amount of the acceleration operator. If an acceleration operation equal to or greater than a preset set acceleration operation amount is detected when the acceleration command value is suppressed, the traveling controller 10 increases the suppression of the acceleration command value. According to this configuration, when the driver performs the approach operation to the parking frame L0, the detection of the approach of the host vehicle MM to the parking frame L0 is defined as the acceleration suppression operation condition. With this, it is possible to perform acceleration suppression having a high acceleration suppression effect upon an erroneous operation of an accelerator pedal while suppressing degradation of drivability. The acceleration suppression is performed in two stages for a case where the vehicle approaches the parking frame L0 and a case where an acceleration operation is further performed after the approach operation, whereby it is possible to perform acceleration suppression having a higher acceleration suppression effect upon an erroneous operation of an accelerator pedal while suppressing degradation of drivability.

(7) If an acceleration operation equal to or greater than the preset set acceleration operation amount is detected when the acceleration command value is suppressed, the traveling controller 10 suppresses the acceleration command value to be equal to or less than a preset upper limit acceleration command value. According to this configuration, even if the driver performs a large acceleration operation, acceleration suppression is performed such that the acceleration command value by the acceleration operation does not becomes larger to be equal to or greater than a preset value. With this, it is possible to suppress the occurrence of unintended acceleration of the driver due to an erroneous acceleration operation. As a result, it is possible to further assist parking in the parking frame L0.

(8) The traveling controller 10 detects at least one of the operation amount of the acceleration operator and the operation speed of the acceleration operator as an acceleration operation amount. According to this configuration, the operation amount of the accelerator pedal 19 and the operation speed of the accelerator pedal operation are detected as an acceleration operation amount. With this, it is possible to distinguish between an erroneous acceleration operation and a normal operation with higher accuracy. As a result, it is possible to realize acceleration suppression having a high acceleration suppression effect with small degradation of drivability.

(9) If the parking frame L0 is detected, the traveling controller 10 detects the approach operation to the parking frame L0 based on at least one piece of information of the speed of the host vehicle MM, the steering angle of the host vehicle MM, the angle α of the host vehicle MM and the parking frame L0, the distance D between the host vehicle MM and the entrance L2 of the parking frame L0, and the positional relationship between a predicted track of the host vehicle MM and the parking frame L0, and detects that the host vehicle MM approaches the parking frame L0 based on the detected approach operation. According to this configuration, with the use of at least one piece of information of the speed of the host vehicle MM, the steering angle of the host vehicle MM, the angle α between the host vehicle MM and the parking frame L0, the distance D between the host vehicle MM and the entrance L2 of the parking frame L0, and the positional relationship between the predicted track of the host vehicle MM and the parking frame L0, it is possible to distinguish whether the host vehicle MM is traveling to pass through the detected parking frame L0 or is about to be parked in the parking frame L0. In this way, it is possible to detect the approach operation to the parking frame L0.

(10) The traveling controller 10 sets the angle α between the travel direction of the host vehicle MM and the parking direction to the parking frame L0 as the angle α between the host vehicle MM and the parking frame L0, and detects the approach operation to the parking frame L0 based on the angle α between the host vehicle MM and the parking frame L0. According to this configuration, the angle α between the travel direction of the host vehicle MM and the parking direction to the parking frame L0 is set as the angle α between the host vehicle MM and the parking frame L0, whereby it is possible to detect the progress of the detected approach operation to the he parking frame L0. Accordingly, it is possible to determine whether or not the host vehicle MM is about to be parked in the parking frame L0 based on the detection value with high accuracy. As a result, it is possible to realize driving assistance having a high acceleration suppression effect with small degradation of drivability.

Second Embodiment

Next, a second embodiment will be described referring to the drawings. The same parts as those in the first embodiment are represented by the same reference numerals.

(Configuration)

The basic configuration of this embodiment is the same as the first embodiment. However, in this embodiment, an example of a case where the determination regarding the approach to the parking frame L0 is performed based on the predicted track of the host vehicle MM, the entrance position of the parking frame L0, and a frame range.

That is, the processing of Step S183 and 108C in the acceleration suppression operation condition determination unit 10I, in particular, the processing of Step S186 is different. Other kinds of processing are the same as those in the first embodiment.

Next, the difference of the configuration will be described. In Step S183, the acceleration suppression operation condition determination unit 10I acquires a steering angle, a steering angular velocity, the speed of the host vehicle MM, a shift position, a parking frame line position, and an entrance position of the parking frame L0.

Figure 30:
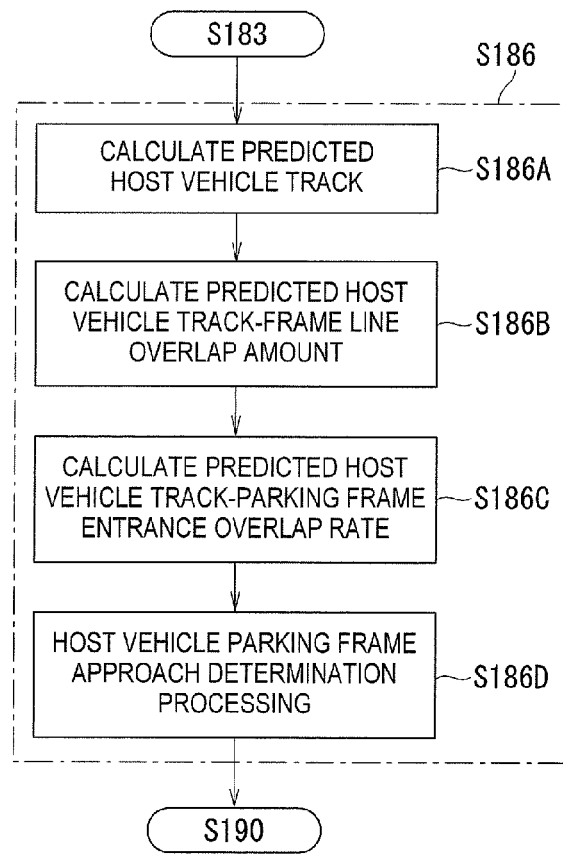
FIG. 30 is a diagram for describing processing of Step S186 according to a second embodiment of the invention.

Next, the processing of Step S186 in this embodiment will be described referring to the drawings. As illustrated in FIG. 30, Step S186 of this embodiment has processing of S186A to S186D.

In Step S186A, the predicted host vehicle track is calculated. For example, the predicted host vehicle track is calculated based on the steering angle, the steering angular velocity, and the shift position acquired in Step S180A. There are various methods of calculating the predicted host vehicle track, and in this embodiment, the method of calculating the predicted track of the host vehicle is not particularly limited. For example, the travel direction of the host vehicle MM is specified by the shift position, and the predicted track of the host vehicle MM is calculated based on the direction of the steering wheel specified by the current steering angle and steering angular velocity.

Figure 31:
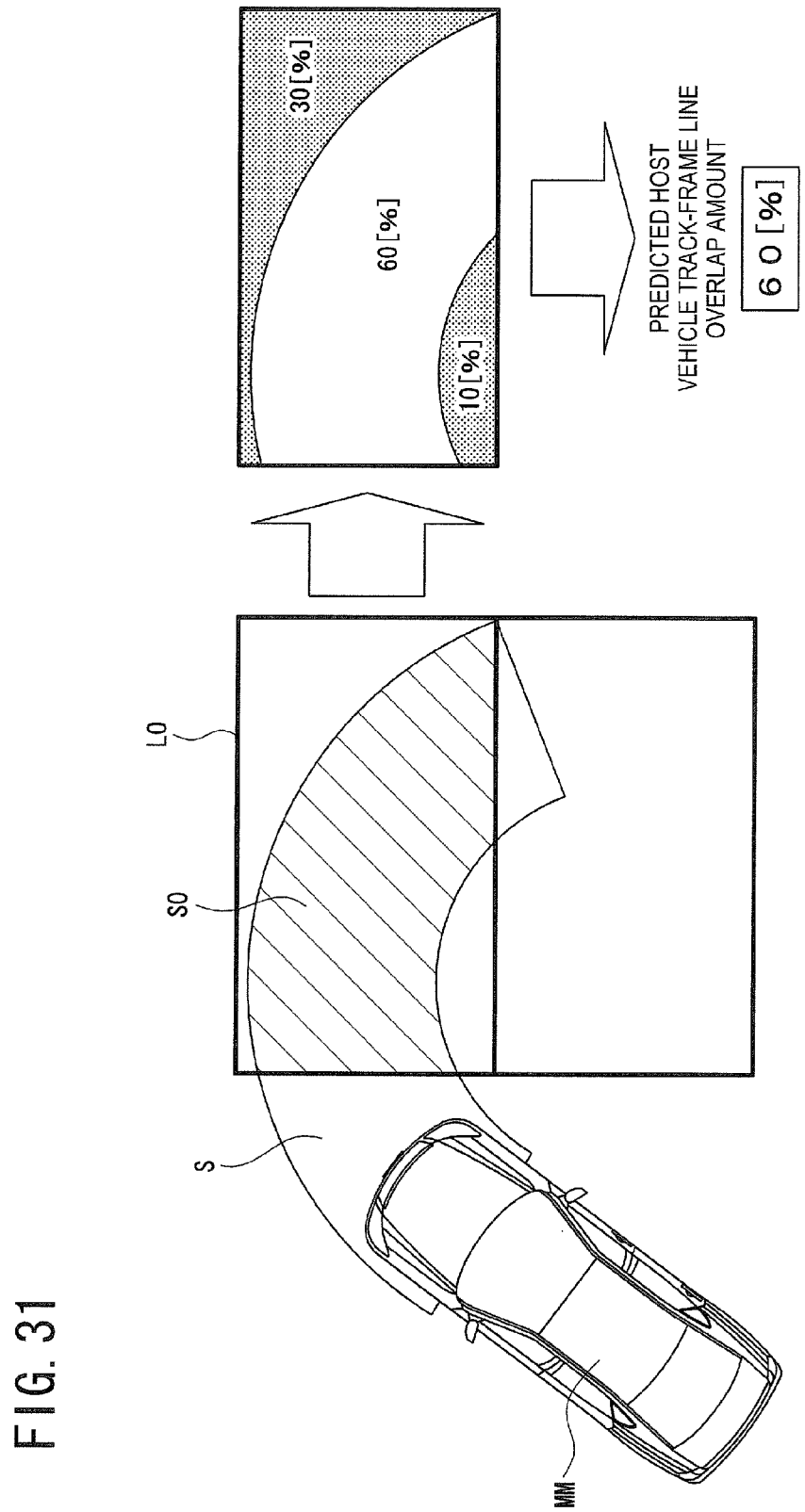
FIG. 31 is a diagram for describing a predicted host vehicle track-frame line overlap amount.

In Step S186B, a predicted host vehicle track-frame line overlap rate is calculated based on the predicted host vehicle track calculated in Step S186A and the parking frame line position acquired in Step S180A. For example, as illustrated in FIG. 31, the ratio of an area S0 occupied by a predicted host vehicle track S passing through the parking frame L0 to an area of the target parking frame L0 is calculated as a predicted host vehicle track-frame line overlap rate.

Figure 32:
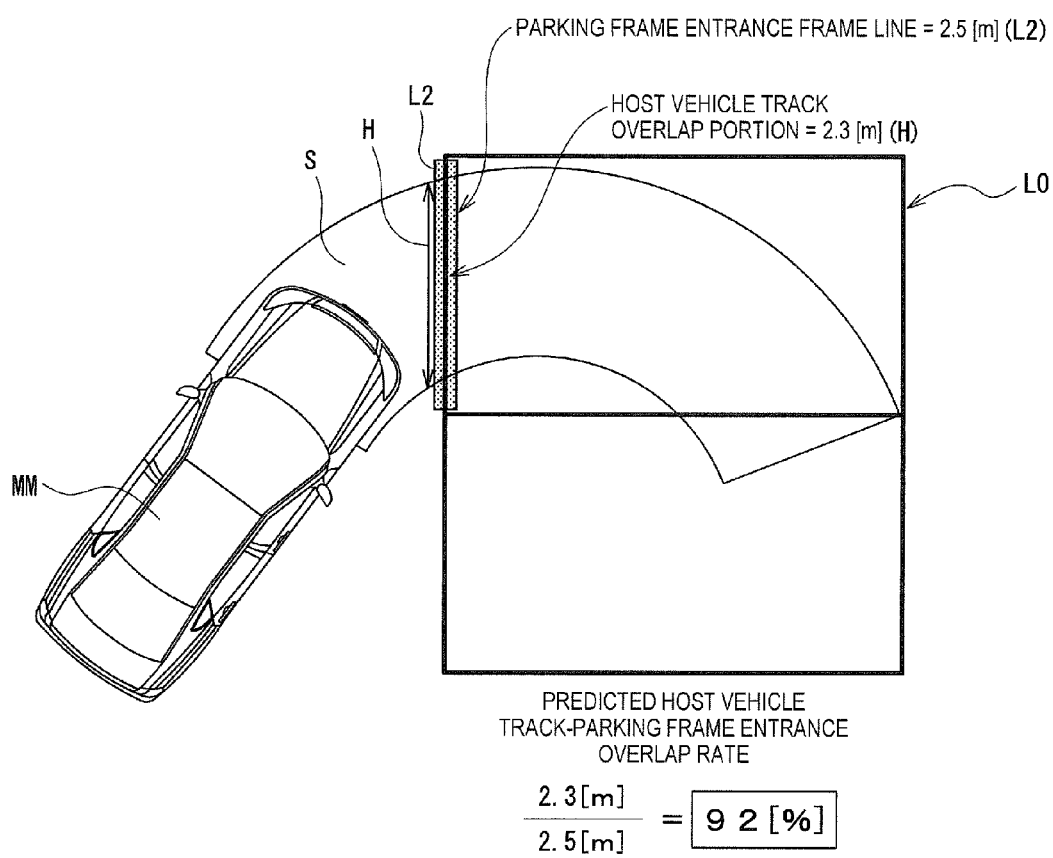
FIG. 32 is a diagram for describing a predicted host vehicle track-parking frame entrance overlap rate.

In Step S186C, a predicted host vehicle track-parking frame entrance overlap rate is calculated based on the predicted host vehicle track calculated in Step S186A and the entrance position of the parking frame L0 acquired in Step S180A. For example, as illustrated in FIG. 32, the ratio of the length of a portion H overlapping the host vehicle track out of the length of one side of a frame line to be the entrance L2 of the parking frame L0 is calculated as a predicted host vehicle track-parking frame entrance overlap rate.

For example, when the entrance L2 of the parking frame L0 is L2=2.5 m and a portion overlapping the host vehicle track is H=2.3 m, the predicted host vehicle track-parking frame entrance overlap rate becomes 2.3÷2.5×100=92 percent. The predicted track is, for example, a range through which a rear wheel passes. A range through a front wheel passes may be defined.

In Step S186D, host vehicle parking frame approach determination is performed based on the predicted host vehicle track-frame line overlap rate calculated in Step S186B and the predicted host vehicle track-parking frame entrance overlap rate calculated in Step S186C.

For example, when the predicted host vehicle track-frame line overlap rate is equal to or greater than a preset value and the predicted host vehicle track-parking frame entrance overlap rate is equal to or greater than a preset value, it is determined that the host vehicle MM approaches the parking frame L0. Specifically, when the predicted host vehicle track-frame line overlap rate is equal to or greater than 40[%] and the predicted host vehicle track-parking frame entrance overlap rate is equal to or greater than 30[%], it is determined that the host vehicle MM approaches the parking frame L0. The determination regarding the host vehicle approaching the parking frame may be performed based on either the predicted host vehicle track-frame line overlap rate or the predicted host vehicle track-parking frame entrance overlap rate.

The approach certainty factor ALVL representing the degree of certainty of the approach to the parking frame may be set in two or more stages based on the predicted host vehicle track-frame line overlap rate.

The degree of certainty of the approach to the parking frame may be determined based on the degree of the progress representing how much a predicted track of a central portion in the width direction between the right and left rear wheels approaches a target parking frame. Other parts are the same as those in the first embodiment.

Regarding Operation and Others

FIG. 33 illustrates an example of a time chart by the processing of this embodiment. This example is an example where the traveling controller 10 detects the approach operation to the parking frame L0 based on the positional relationship between the predicted track of the host vehicle MM and the parking frame L0.

In the example illustrated in FIG. 33, if the parking frame L0 having a preset degree of certainty (certainty factor) is detected (t1) and the speed is equal to or lower than a preset set speed (t2), the determination regarding the approach operation to the parking frame L0 is performed. In the example illustrated in FIG. 33, if it is detected that the predicted host vehicle track-frame line overlap rate is equal to or greater than a preset value (t3) and the predicted host vehicle track-parking frame entrance overlap rate is equal to or greater than a preset value (t7), it is determined to be the approach operation to the parking frame L0 and the acceleration suppression operation state is brought.

In the acceleration suppression operation state, if the driver performs an accelerator operation, the acceleration command value (throttle opening) depending on the accelerator operation is suppressed. Furthermore, in a state where the acceleration suppression is being executed, if the accelerator operation amount is equal to or greater than a preset operation amount (t8), the suppression amount of the acceleration command value increases. In this embodiment, as a result of performing acceleration suppression so as to be suppressed to be equal to or less than a preset throttle opening, as illustrated in FIG. 11, an actual throttle opening is suppressed small compared to before the accelerator operation amount exceeds the preset operation amount. As a result, acceleration suppression against a driver's erroneous operation of the accelerator pedal 19 is more effectively executed.

In this embodiment, the parking frame approach determination is performed based on the predicted host vehicle track-frame line overlap rate and the predicted host vehicle track-parking frame entrance overlap rate, whereby it is possible to detect a parking operation more accurately and to realize an assistance system with smaller degradation of drivability.

(Effects of this Embodiment)

According to this embodiment, the following effects are obtained in addition to the effects according to the first embodiment.

(1) The traveling controller 10 detects the positional relationship between the predicted track of the host vehicle MM and the parking frame L0 based on information regarding the steering angle of the host vehicle MM, the steering angular velocity of the host vehicle MM, the speed of the host vehicle MM, and the shift position of the host vehicle MM and information regarding at least one of the frame line position of the parking frame L0 and the entrance position of the parking frame L0, detects the positional relationship between the predicted track of the host vehicle MM and the parking frame L0, and detects the approach operation to the parking frame L0 based on the detected positional relationship between the predicted track of the host vehicle MM and the parking frame L0. With the use of information regarding the steering angle of the host vehicle MM, the steering angle of the host vehicle MM, the steering angular velocity of the host vehicle MM, the speed of the host vehicle MM, and the shift position of the host vehicle MM, it is possible to calculate the predicted track of the host vehicle MM. Then, the positional relationship between the predicted track of the host vehicle MM and the parking frame L0 is detected from the calculated predicted track of the host vehicle MM and information regarding at least one of the frame line position of the parking frame L0 and the entrance position of the parking frame L0. With this, it is possible to detect the approach operation of the host vehicle MM to the parking frame L0 with higher accuracy.

(2) The traveling controller 10 detects the approach operation to the parking frame L0 based on the degree of overlap of the predicted track of the host vehicle MM and the parking frame L0. With this, when the degree of overlap is greater, it is possible to detect the host vehicle MM being moving toward the parking frame L0, whereby it is possible to detect the approach operation of the host vehicle MM to the parking frame L0 with higher accuracy.

(3) The traveling controller 10 detects the approach operation to the parking frame L0 based on the degree of overlap of the predicted track of the host vehicle MM and the entrance L2 of the parking frame L0. It is possible to detect the host vehicle MM being moving toward the parking frame L0 based on the degree of overlap. As a result, it is possible to detect the approach operation of the host vehicle MM to the parking frame L0 with higher accuracy.

Although the invention has been described referring to a limited number of embodiments, these should not be construed as limitations on the scope of the invention, and those skilled in the art, having benefit of this disclosure, will appreciate modifications and variations therefrom.

The invention claimed is:

1. A driving assistance device comprising:
an acceleration operation amount detection unit configured to detect an acceleration operation amount of an acceleration operator operated by a driver to instruct acceleration;
a driving force control unit configured to generate the acceleration depending on the acceleration operation amount detected by the acceleration operation amount detection unit in a host vehicle;
an imaging unit configured to acquire a captured image obtained by capturing an image of a periphery of the host vehicle;
a line detection unit configured to detect a line positioned on a road surface from the captured image;
a railway crossing detection unit configured to detect a railway crossing which crosses railway lines based on the captured image;
a parking frame extraction unit configured to extract a parking frame which is estimated as a line in a direction along a front-back direction of the host vehicle when the host vehicle is parked, based on the line detected by the line detection unit; and
an acceleration suppression control unit configured to suppress the acceleration when the parking frame extraction unit extracts the parking frame and the railway crossing is not detected in the captured image, and to not suppress the acceleration regardless of whether the parking frame extraction unit extracts the parking frame or not when the parking frame extraction unit extracts the parking frame and the railway crossing is detected in the captured image.

2. The driving assistance device according to claim 1, wherein the line detection unit detects the line positioned on the road surface based on an overhead image obtained by overhead-view-converting the captured image.

3. The driving assistance device according to claim 1, wherein:
the railway crossing detection unit detects a crossing related display line, which is a line displayed at a crossing position, among a plurality of lines detected by the line detection unit to detect the railway crossing, and
the parking frame extraction unit extracts a parking frame based on a line other than the line detected as the crossing related display line by the railway crossing detection unit among the lines detected by the line detection unit.

4. The driving assistance device according to claim 3, wherein the railway crossing detection unit detects the crossing related display line based on an overhead image obtained by overhead-view-converting the captured image.

5. The driving assistance device according to claim 3, further comprising:
an interpolation processing unit configured to regard two adjacent lines discontinued by a discontinuous length within a preset interpolation distance as one line, the two adjacent lines being positioned along a single virtual line,
wherein, when two adjacent lines discontinued by a discontinuous length greater than the interpolation distance but less than a maximum interpolation length are detected, the railway crossing detection unit determines whether or not there is a line which is paired with one of the two detected adjacent lines in a line width direction of the one of the two detected adjacent lines, and when there is the paired line, and when the one of the two detected adjacent lines and the paired line have the same length and a discontinuous portion on the one of the two detected adjacent lines side and a discontinued portion on the paired line have the same discontinuous length, the railway crossing detection unit detects the one of the two adjacent lines as the crossing related display line.

* * * * *